US008159690B2

(12) United States Patent
Motoyama

(10) Patent No.: US 8,159,690 B2
(45) Date of Patent: Apr. 17, 2012

(54) IMAGE PROCESSING APPARATUS AND CONTROL PROGRAM FOR IMAGE PROCESSING APPARATUS

(75) Inventor: Toshiki Motoyama, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 843 days.

(21) Appl. No.: 12/243,190

(22) Filed: Oct. 1, 2008

(65) Prior Publication Data
US 2009/0086248 A1 Apr. 2, 2009

(30) Foreign Application Priority Data

Oct. 1, 2007 (JP) .................... 2007-257088

(51) Int. Cl.
H04N 1/387 (2006.01)
G06F 3/12 (2006.01)
(52) U.S. Cl. ...................... 358/1.13; 358/450
(58) Field of Classification Search .......... 382/285, 382/154, 274; 358/296, 448, 464, 488, 1.13, 358/1.9
See application file for complete search history.

(56) References Cited

U.S. PATENT DOCUMENTS

| 5,057,937 A * | 10/1991 | Muramatsu et al. ........... 358/405 |
| 5,377,019 A * | 12/1994 | Okisu et al. .................... 358/464 |
| 5,479,262 A * | 12/1995 | Namiki et al. ................. 358/296 |
| 5,790,262 A * | 8/1998 | Kanno ............................. 358/296 |
| 5,969,795 A * | 10/1999 | Honda ............................... 355/25 |
| 6,011,635 A * | 1/2000 | Bungo et al. ................... 358/488 |
| 2008/0013857 A1* | 1/2008 | Ohk ................................. 382/274 |
| 2009/0320554 A1* | 12/2009 | Watabe et al. ....................... 73/7 |

FOREIGN PATENT DOCUMENTS

| JP | 7-212539 | * | 8/1995 |
| JP | 8-44251 A | | 2/1996 |
| JP | 2006-165713 A | | 6/2006 |
| JP | 2006-246136 A | | 9/2006 |

OTHER PUBLICATIONS

JP Office Action dtd Sep. 8, 2009, JP Appln. 2007-257088, partial English translation.

* cited by examiner

Primary Examiner — Jerome Grant, II
(74) Attorney, Agent, or Firm — Banner & Witcoff, Ltd.

(57) ABSTRACT

An image processing apparatus is provided which includes a reading unit configured to read image data of a double-page original having a binding part, an output unit configured to generate output based on the image data, and a processing unit. The processing unit is configured to identify and remove shadow data corresponding to a portion of a shadow area in the image data, determine whether two-dimensional code data is included in the image data, and control the removal of the shadow data in the image data when the two-dimensional code data is included in the image data.

28 Claims, 14 Drawing Sheets

| DENSITY CONVERSION PATTERN | REMOVAL LEVEL | REMOVAL THRESHOLD |
|---|---|---|
| DENSITY CONVERSION PATTERN (1) | +2 | DENSITY A |
| DENSITY CONVERSION PATTERN (2) | +1 | DENSITY B |
| DENSITY CONVERSION PATTERN (3) | 0 | DENSITY C |
| DENSITY CONVERSION PATTERN (4) | −1 | DENSITY D |
| DENSITY CONVERSION PATTERN (5) | −2 | DENSITY E |

IMAGE PROCESSING APPARATUS AND CONTROL PROGRAM FOR IMAGE PROCESSING APPARATUS

CROSS REFERENCE TO RELATED APPLICATION

This application claims priority from Japanese Patent Application No. 2007-257088, filed on Oct. 1, 2007, the entire subject matter of which is incorporated herein by reference.

BACKGROUND

1. Field of the Invention

Aspects of the present invention relate to an image processing apparatus provided with a shadow removal unit which may remove, from image data of a double-page spread original having a binding part, an influence of shadow generated through the binding part, and a control program for the image processing apparatus. In particular, the invention relates to an image processing apparatus which may appropriately remove, in a case where a two-dimensional code exists in a double-page spread original set as a copy target, an influence of shadow in the image data, and a control program for the image processing apparatus.

2. Description of the Related Art

Conventionally, an image processing apparatus has been used for copying a double-page spread original having a binding part (for example, a book, a notebook, or the like). In general, in a case where the double-page spread original is read by a scanner or the like, in the read image data, data on a black strip-shaped image based on shadow (hereinafter, referred to as shadow data) is included in a region corresponding to the binding part. The binding part hardly touches contact glass of the image processing apparatus during scanning due to its structure, and thus shadow data is typically generated in the image data of the double-page spread original.

Therefore, when a general image processing apparatus outputs the image data, the black strip-shaped image data is also output in the region corresponding to the binding part, and various problems occur such as decrease in readability of the output result and degradation in visual quality.

To solve this problem, Japanese Unexamined Patent Application Publication No. 08-044251 describes an image processing apparatus provided with a center deletion mode. To be more specific, according to the image processing apparatus according to Japanese Unexamined Patent Application Publication No. 08-044251, in a case where the center deletion mode is set, a process of removing the black strip-shaped image data at a center part of the double-page spread original having the binding part (a book original in Japanese Unexamined Patent Application Publication No. 08-044251) (which is equivalent to the shadow) is executed. With this configuration, a user can obtain an output result based on the double-page spread original in which the shadow data in the region corresponding to the binding part is removed.

In recent years, a two-dimensional code which is created on the basis of predetermined information is sometimes placed on the double-page spread original such as a magazine or a catalog. By reading this two-dimensional code through a predetermined code reading apparatus, the two-dimensional code may provide more information than an occupying space for the two-dimensional code could provide, and thus the two-dimensional code functions as useful information providing means.

Then, in the double-page spread original, there are also such cases that the two-dimensional code is placed in the vicinity of the binding part. In this case, when the image forming apparatus according to Japanese Unexamined Patent Application Publication No. 08-044251 makes a copy of the double-page spread original on which the two-dimensional code is placed in the vicinity of the binding part while the shadow data in the vicinity of the binding part is removed, along with the removal of the shadow data in the vicinity of the binding part, a part of an image constituting the two-dimensional code may also be removed in some cases. Then, if the damage of the two-dimensional code along with the removal of the shadow data reaches or exceeds a predetermined proportion, the code reading apparatus cannot read the damaged two-dimensional code.

That is, the image forming apparatus according to Japanese Unexamined Patent Application Publication No. 08-044251 has a problem that it is not possible to obtain the information based on the two-dimensional code in the output result after the removal of the shadow data.

SUMMARY

Aspects of the present invention provide an image processing apparatus with a shadow removal unit and a control program for the image processing apparatus, in particular, an image processing apparatus which may remove shadow data without preventing information from being obtained from a two-dimensional code when a double-page original on which the two-dimensional code is placed is copied and a control program for the image processing apparatus.

According to one illustrative aspect an image processing apparatus is provided. The apparatus includes a reading unit configured to read image data of a double-page original having a binding part, an output unit configured to generate output based on the image data, and a processing unit. The processing unit may be configured to identify and remove shadow data corresponding to at least a portion of a shadow area in the image data, determine whether two-dimensional code data is included in the image data, and control the removal of the shadow data in the image data in response to determining that the two-dimensional code data is included in the image data.

In another aspect of the invention, an image processing apparatus may include a reading unit configured to read image data of a double-page original having a binding part, an output unit configured to generate an output based on the image data, a conversion pattern storage area configured to store density conversion patterns, and a processing unit. The processing unit may be configured to receive an input and, in response to the input, convert a density of shadow data corresponding to a shadow area in the image data into a first density conversion pattern from among the density conversion patterns stored in the conversion pattern storage area. Also, the processing unit may be configured to determine whether two-dimensional code data is included in the image data, and determine whether an overlapping area exists where the shadow area corresponding to the shadow data in the image data overlaps with a two-dimensional code area corresponding to the two-dimensional code data in response to determining that the two-dimensional code data is included in the image data. In addition, the processing unit may be further configured to remove the shadow data from the image data on the basis of the first density conversion pattern in response to determining that the overlapping area does not exist, and in response to determining that the overlapping area exists, change the first density conversion pattern to a second density conversion pattern from among the density conversion patterns, and remove the shadow data from the image data on the basis of the second density conversion pattern.

According to another illustrative aspect an image processing apparatus is provided including a reading unit configured to read image data of a double-page original having a binding part, a display unit configured to display the image data, an output unit configured to generate output based on the image data, and a processing unit. The processing unit is configured to identify shadow data corresponding to at least a portion of a shadow area in the image data, determine whether two-dimensional code data is included in the image data, and cause the display unit to display a notification indicating the two-dimensional code data is included in the image data and prompt a user to input whether the two-dimensional code is needed in response to determining that the two-dimensional code data is included in the image data. Also, the processing unit is further configured to receive a user input selecting whether the two-dimensional code is needed, and remove the shadow data on the basis of the user input.

DETAILED DESCRIPTION

First Illustrative Embodiment

Figure 1:
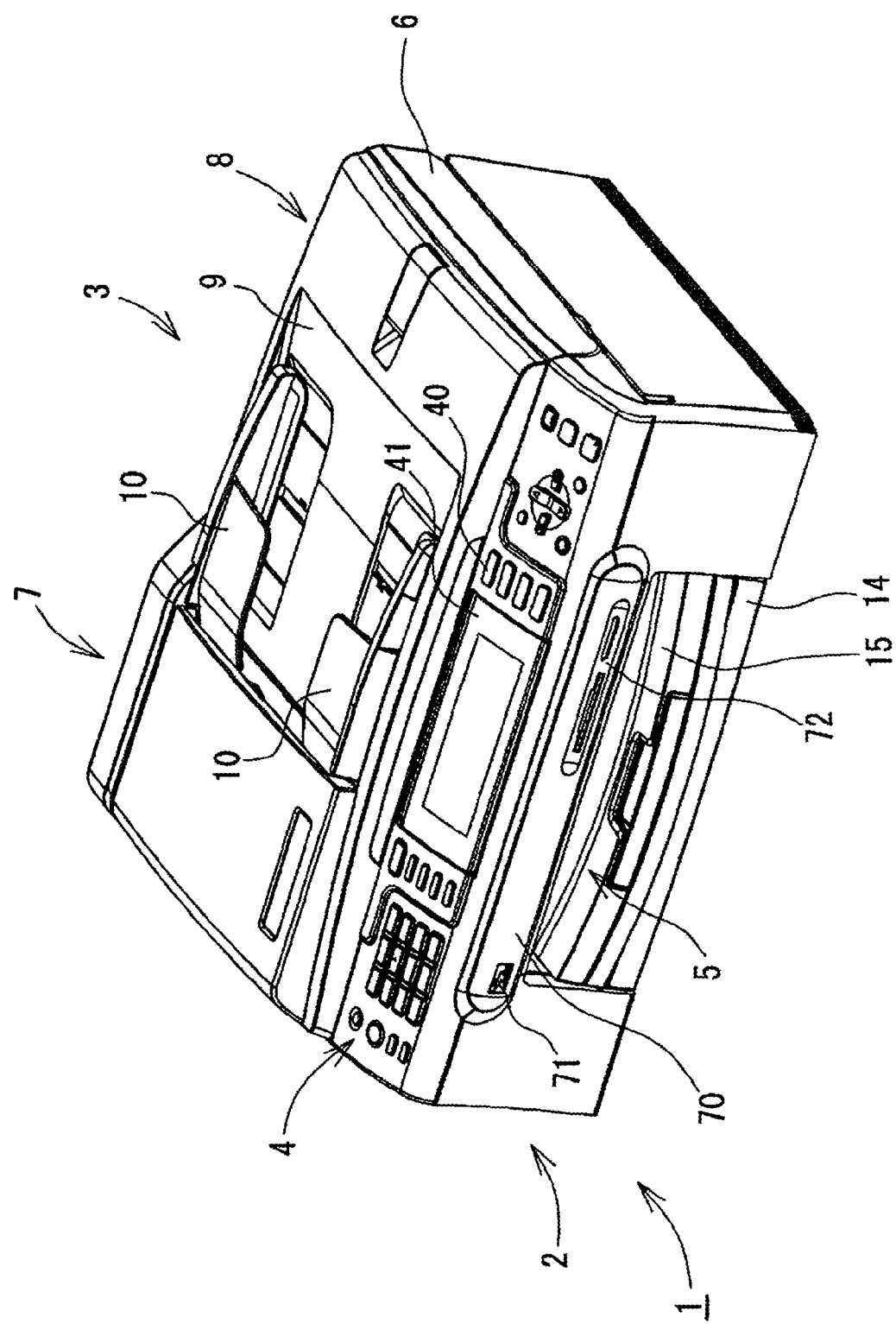
FIG. 1 illustrates a multi function peripheral device.

Hereinafter, an illustrative embodiment of embodying an image processing apparatus and a control program of the image processing apparatus according to the present invention into a multi function peripheral device 1 will be described in detail with reference to the drawings. FIG. 1 illustrates a multi function peripheral device 1 (which is also referred to as MFP device or multi function printer) according to an embodiment of the present invention. In addition, FIG. 2 shows the multi function peripheral device 1 in a state where an original cover 8 is opened.

As illustrated in FIG. 1, the multi function peripheral device 1 is provided with a printer 2 in a lower part, a scanner 3 in an upper part, and an operation panel 4 on a front side of the scanner 3 in an integrated manner. The multi function peripheral device 1 has a printer function, a scanner function, a copy function, and a facsimile function.

It should be noted that the multi function peripheral device 1 is connected to a computer (not shown). On the basis of image data or document data sent from the computer, the multi function peripheral device 1 may record the image or the document on a recording sheet (medium to be recorded). In addition, through a connection to an external device such as a digital camera, the multi function peripheral device 1 can also record the image data output from the external device such as the digital camera on the recording sheet. It should be noted that while various storage media such as a memory card are loaded into the multi function peripheral device 1, image data or the like which is stored in the storage medium can also be recorded on the recording sheet.

Figure 2:
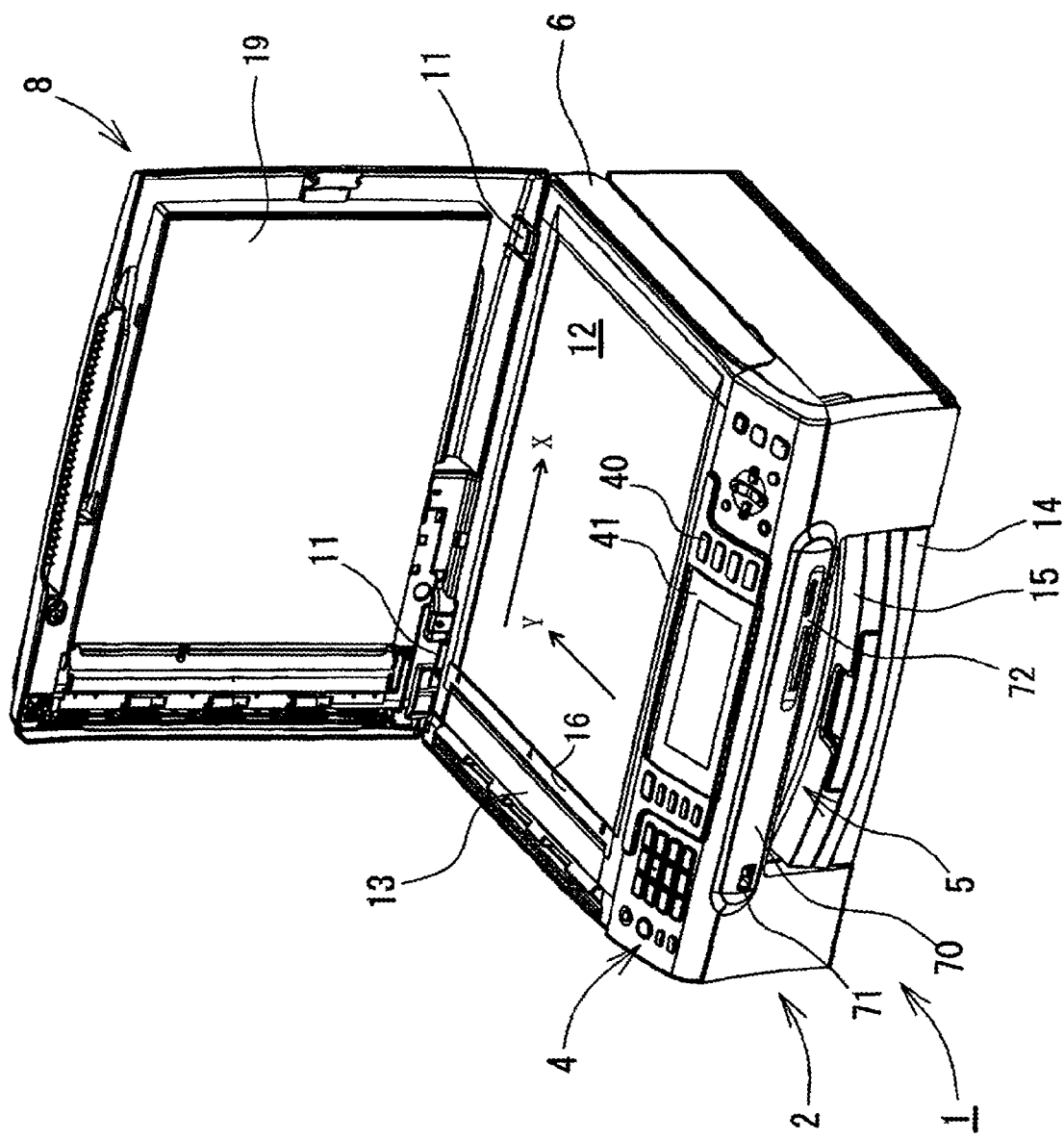
FIG. 2 illustrates the multi function peripheral device in a state where an original cover is opened.

In the scanner 3, the original cover 8 is attached to an original reading flatbed 6 functioning as an FBS (Flatbed Scanner) so as to be opened and closed while a hinge on the back face side is used as a supporting point (refer to FIG. 2).

On the original cover 8, an auto document feeding mechanism 7 (ADF: auto document feeder) is arranged. In addition, an original holding member 19 is provided on a back side of the original cover 8. The original holding member 19 is a plate-like member having at least one white face. The white face is fixed downward (refer to FIG. 2).

The auto document feeding mechanism 7 is for feeding an original through an original feeding path from an original tray 9 to an original discharging tray 10. In the auto document feeding mechanism 7, an original leading end sensor (not shown) is arranged which detects the leading end of the original when the original is taken in. In the multi function peripheral device 1, the leading end of the original detected by the original leading end sensor is used as a reference position to carry out the document feeding control.

On the other hand, a top face of the original reading flatbed 6 is largely opened, and a platen glass 12 is fit into the opening. An original, when placed on the top face of the platen glass 12, has a side which abuts an original guide 16 is arranged on one end of the top face of the platen glass 12 (on the left side in FIG. 2).

Then, inside the original reading flatbed 6, the image reading unit 3A (refer to FIG. 3) is arranged so as to be movable. The image reading unit 3A is arranged so as to be able to reciprocate in a sub scanning direction (X direction). Herein, a direction perpendicular to the sub scanning direction X is referred to as main scanning direction (Y direction). In addition, inside the original reading flatbed 6, a supporting member for the image reading unit 3A, a driving mechanism for the image reading unit 3A, and the like are arranged. Details of the image reading unit 3A will be described later.

In a case where the scanner 3 structured in the above-mentioned manner is used as the FBS (Flatbed Scanner), the original cover 8 is opened, the original is placed on the platen glass 12, and the original cover 8 is closed, so that the original is fixed thereon. The original is fixed while being sandwiched between the platen glass 12 and the original holding member 19. When a reading start instruction is input, the image reading unit 3A is scanned along the back face of the platen glass 12 in the sub scanning direction X and an image of the original is read.

Regarding this point, in a case where the auto document feeding mechanism 7 is used while the original is automatically fed to carry out the reading, during the original feeding process by the auto document feeding mechanism 7, the original passes through a reading face 13 on the original reading flatbed 6. At this time, the image reading unit 3A is situated below the reading face 13. Therefore, in the original feeding process, at a moment when the original passes through the reading face 13, the image reading unit 3A reads the image data of the original. The image reading is carried out by the auto document feeding mechanism 7 in a state where the original cover 8 is closed with respect to the original reading flatbed 6.

The printer 2 can be an image recording apparatus of a so-called inkjet system which selectively ejects ink droplets on the basis of the image data read by the scanner 3 or the image data input from the outside to record the image on the recording sheet (inkjet recording apparatus). As described above, the printer 2 is arranged below the scanner 3.

On the front of the multi function peripheral device 1 (that is, on the front side of the printer 2), an opening 5 is formed. Inside the opening 5, a sheet feeding tray 14 and a sheet discharging tray 15 are provided so as to be fully accommodated. The sheet feeding tray 14 and the sheet discharging tray 15 are arranged in upper and lower stages. In the upper stage, the sheet discharging tray 15 may be provided, and the sheet feeding tray 14 may be provided below the sheet discharging tray 15.

As illustrated in FIG. 1, on the front of the multi function peripheral device 1, the operation panel 4 is provided. The operation panel 4 is an operation unit for operating the printer 2 and the scanner 3. The operation panel 4 is provided with an operation key 40 and an LCD 41.

The operation key 40 is provided with an arrow key, a ten key, and the like. Therefore, a user can input a desired command by using the operation panel 4. When the desired command is input, in the multi function peripheral device 1, various operations may be performed on the basis of the input command.

Then, the LCD 41 is a so-called color liquid crystal display, on which a preview screen or the like described later is displayed. A detail of the preview screen or the like will be described later.

On an upper side of the opening 5, a connection panel 70 is provided. On a left end side of the connection panel 70, a USB port 71 is arranged. The USB port 71 is a connector terminal. Through a USB connection with an external device, the connector terminal connects the external device with the multi function peripheral device 1 so as to be communicable with each other.

In addition, on a right end side of the connection panel 70, a slot part 72 is arranged. In the slot part 72, a plurality of card slots are provided into which portable memory cards can be loaded. Therefore, in the multi function peripheral device 1, when a memory card is loaded into the card slot, it is possible to read out the storage contents of the memory card.

Figure 3:
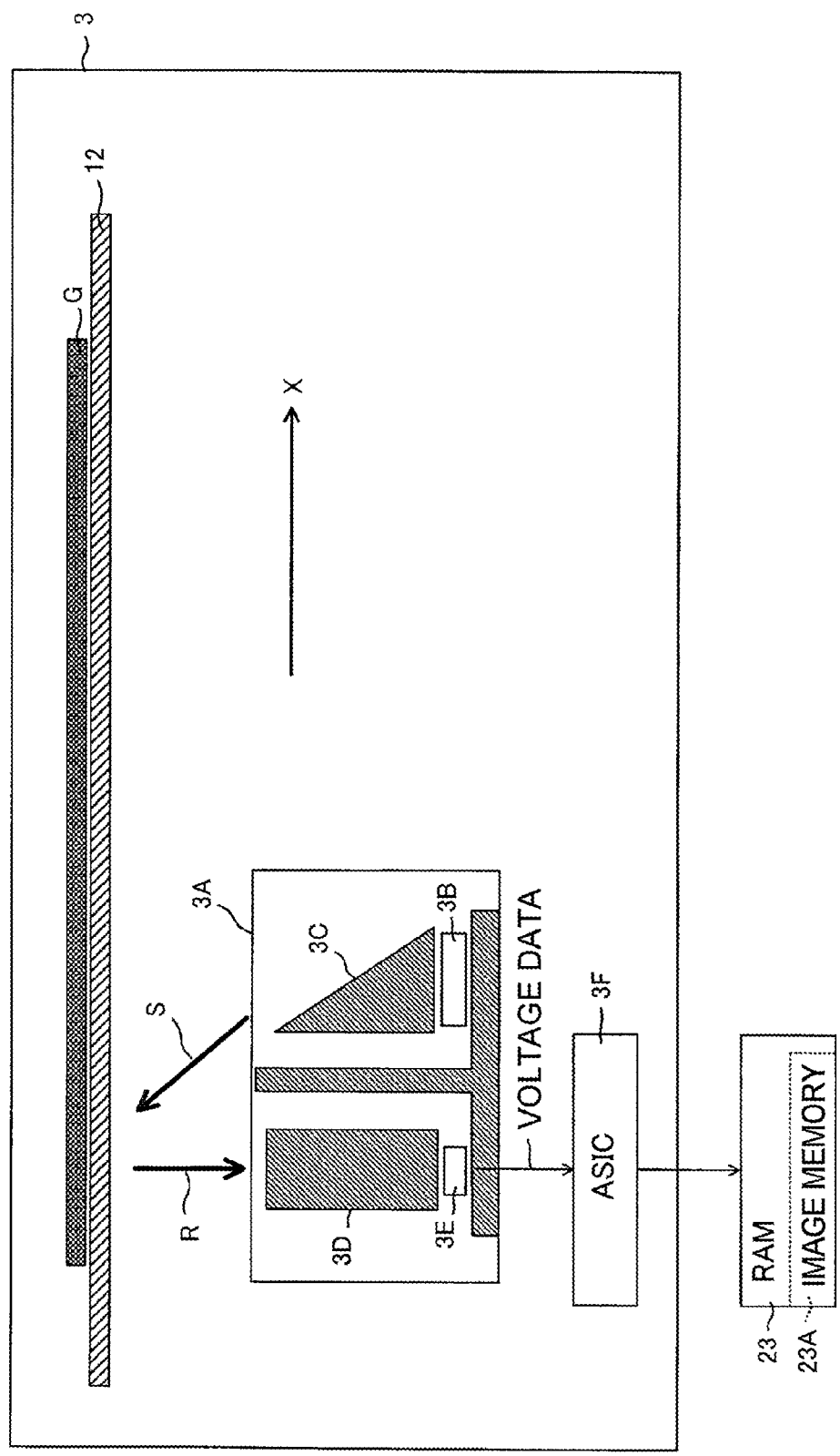
FIG. 3 is a frontal cross sectional view schematically illustrating a configuration of a scanner.

Next, an outline of the scanner 3 related to the multi function peripheral device 1 will be described. FIG. 3 is a diagram schematically illustrating the configuration of the scanner 3.

An image reading unit 3A is adopted to read the original through a CIS system. Then, the image reading unit 3A is provided with an LED 3B, a light guiding member 3C, a light guiding member 3D, and an image pickup element 3E for one line in the main scanning direction Y. The image reading unit 3A is arranged so as to be able to reciprocate in the sub scanning direction X.

The LED 3B constituting the image reading unit 3A functions as a light source for irradiating light. In addition, the light guiding member 3C guides light to a reading part of an original (for example, a book original G). Then, the image pickup element 3E outputs a voltage in accordance with the intensity of the received light. In addition, the light guiding member 3D guides light reflected by the original to the image pickup element 3E.

When the original (for example, the book original G) is placed on the top face of the platen glass 12 and an original reading button of the operation key 40 is pressed, the image reading unit 3A is fed to an original reading start position, and the original reading is started. First, the LED 3B is turned ON to irradiate the light. A path of the light is changed by the light guiding member 3C, and the light is irradiated toward an upper part of the image pickup element 3E as irradiation light S. Among the light reflected by a surface of the original (the platen glass 12), reflection light R which is reflected toward the image pickup element 3E is guided by the light guiding member 3D and received by the image pickup element 3E. The image pickup element 3E is composed of a CMOS sensor or the like. The image pickup element 3E outputs a voltage value in accordance with the intensity of the received light, and the voltage value is input to an ASIC 3F. The image pickup element 3E may be composed by arranging a plurality of elements on a straight line (in the main scanning direction Y), and one element forms one pixel on the line of the image data. When one line of the original is read, in order to read the next line, the image reading unit 3A is moved by a predetermined amount in the sub scanning direction X, and the reading of the next line is carried out. By repeating reading one line at a time and moving the predetermined amount, the reading of the original is carried out. It should be noted that the predetermined amount is appropriately set on the basis of a resolution or the like when the reading operation is initiated.

The ASIC 3F is an integrated circuit designed to output the voltage value input from the respective image pickup elements 3E as image data. To be more specific, the ASIC 3F converts the voltage value input from the respective image pickup elements 3E into 16-bit numerical data. After various data corrections are performed, the image data is output. Herein, color data (R value, G value, and B value) corresponding to one element of the image pickup element 3E is formed by a 16-bit numerical value.

Then, the image data output from the ASIC 3F is written via a bus line 25 to an image memory 23A of a RAM 23 (refer to FIG. 4) to be stored as image data.

Figure 4:
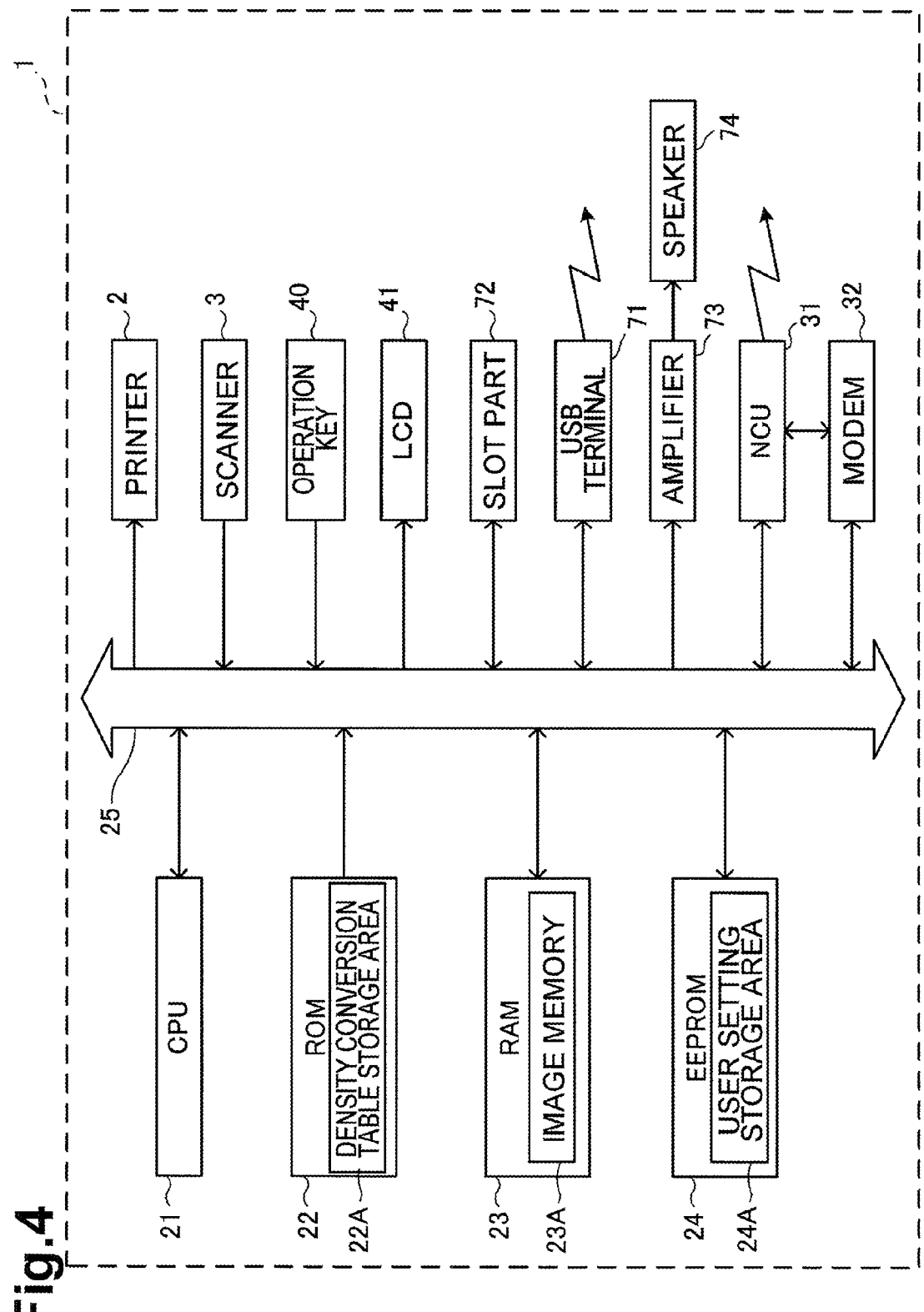
FIG. 4 is a block diagram of a control system of the multi function peripheral device.

Next, a control system configuration of the multi function peripheral device 1 according to the present illustrative embodiment will be described. FIG. 4 is a block diagram of an electric configuration of the multi function peripheral device 1.

As illustrated in FIG. 4, the multi function peripheral device 1 is provided with a CPU 21, a ROM 22, the RAM 23, and an EEPROM 24. Then, the CPU 21, the ROM 22, the RAM 23, and the EEPROM 24 are mutually connected via the bus line 25 to the printer 2, the scanner 3, an NCU 31 (Network Control Unit), a modem 32, the operation key 40, the LCD 41, the USB port 71, the slot part 72, an amplifier 73, and a speaker 74. That is, the multi function peripheral device 1 is controlled by the CPU 21, the ROM 22, and the RAM 23 so as to realize various functions (that is, the printer function, the scanner function, the copy function, and the facsimile function). Computer readable media may include external memory, EEPROM 24, ROM 22 and RAM 23. The computer readable media may contain computer executable instructions executable by the CPU 21.

Figure 13:
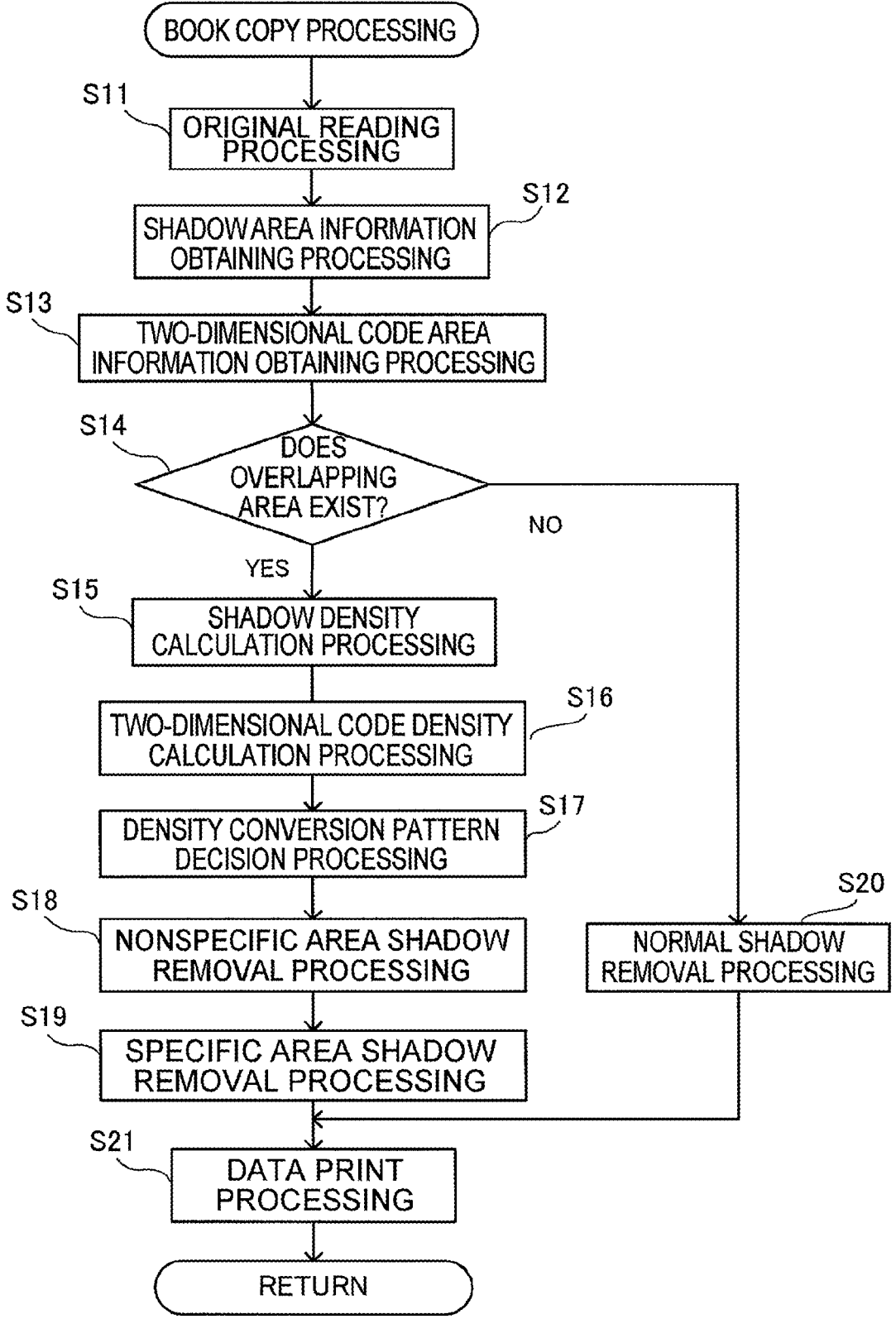
FIG. 13 is a flowchart of the book copy processing program according to a third embodiment of the present invention.
Figure 14:
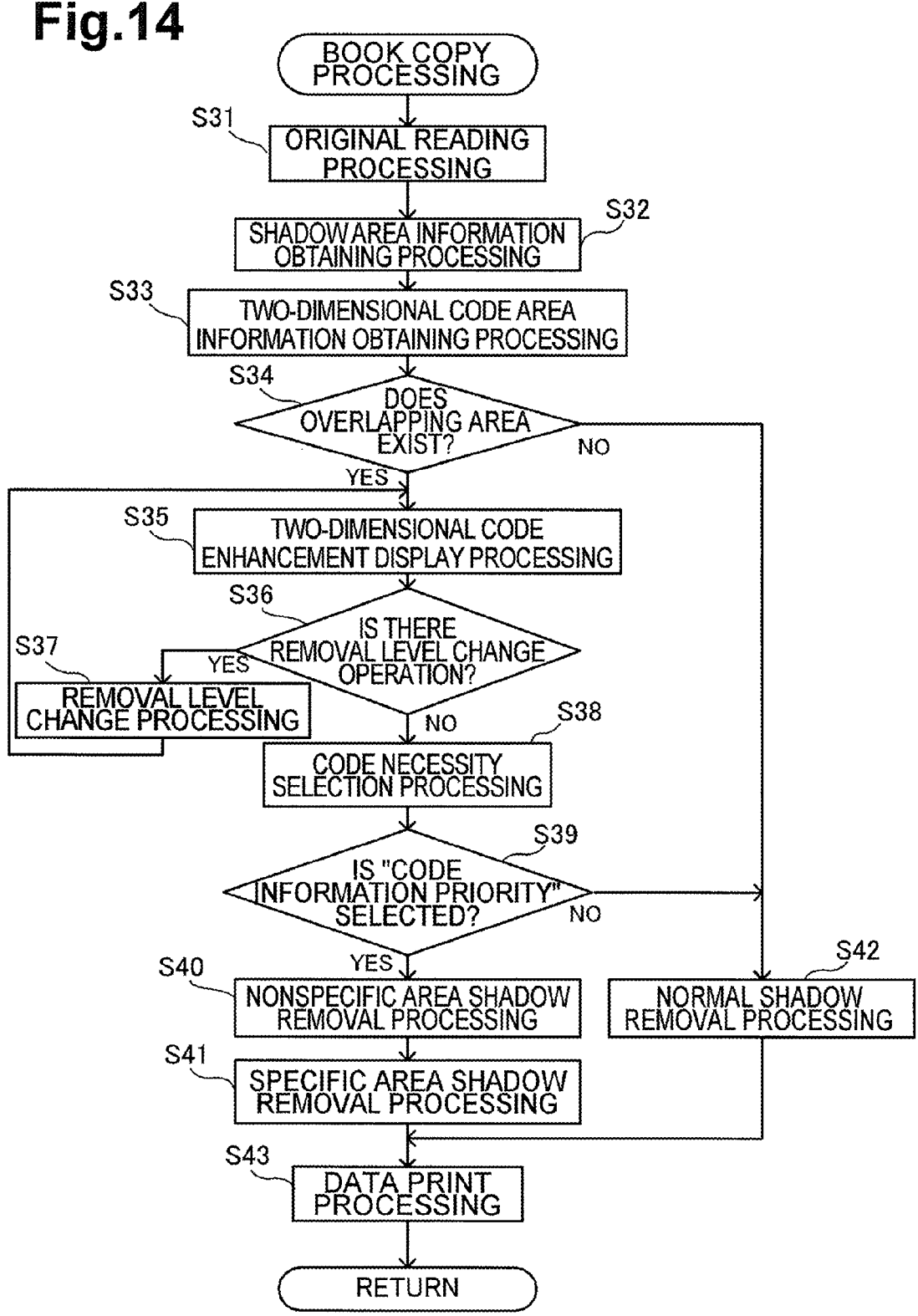
FIG. 14 is a flowchart of the book copy processing program according to a fourth embodiment of the present invention.

That is to say, the CPU 21 controls the respective units which are connected via the bus line 25 while following data tables and program stored in the ROM 22, the RAM 23, and the EEPROM 24. The CPU 21 also controls various signals sent and received via the NCU 31. The CPU 21 is configured to execute the various processes discussed below in connection with FIGS. 5, 13 and 14.

The ROM 22 is a non-rewritable memory which stores various control programs and data tables. For example, the ROM 22 stores a book copy processing program executed by the CPU 21, which will be described, as one of the control programs.

Then, in the ROM 22, a density conversion table storage area 22A is formed. The density conversion table storage area 22A stores density conversion patterns. The density conversion table is used when shadow data is removed from the image data read by the scanner 3 in the book copy processing program which will be described. The density conversion table will be described in detail below.

The RAM 23 is a rewritable memory for storing various data. The RAM 23 is provided with various memories such as the image memory 23A. The image memory 23A is for storing image data of the original and the like read by the scanner 3.

Then, the EEPROM 24 is a storage unit in which the storage contents can be freely written. The EEPROM 24 may save the storage contents unlike the RAM 23 even in a case of the power supply to the multi function peripheral device 1 being interrupted. In the EEPROM 24, a user setting storage area 24A is formed. The user setting storage area 24A stores user setting data indicating conditions arbitrarily set by the user with respect to the various functions. For example, the user setting data related to a shadow removal level which will be described later is stored in the user setting storage area 24A.

The NCU 31 performs operations of sending a dial signal to a telephone network (not shown) and responding to a ringing signal from the telephone network, and the like. The modem 32 modulates and demodulates the image data via the NCU 31 to transmit the image data to an opponent party facsimile apparatus (not shown) and also to send and receive various protocol signals for the transmission control. The USB port 71 is a known circuit which performs sending and receiving of data via the computer and a USB cable or wireless device (not shown). The amplifier 73 is a circuit for providing sound to the speaker 74 connected to the amplifier 73 to output a ringing tone and the like.

Figure 5:
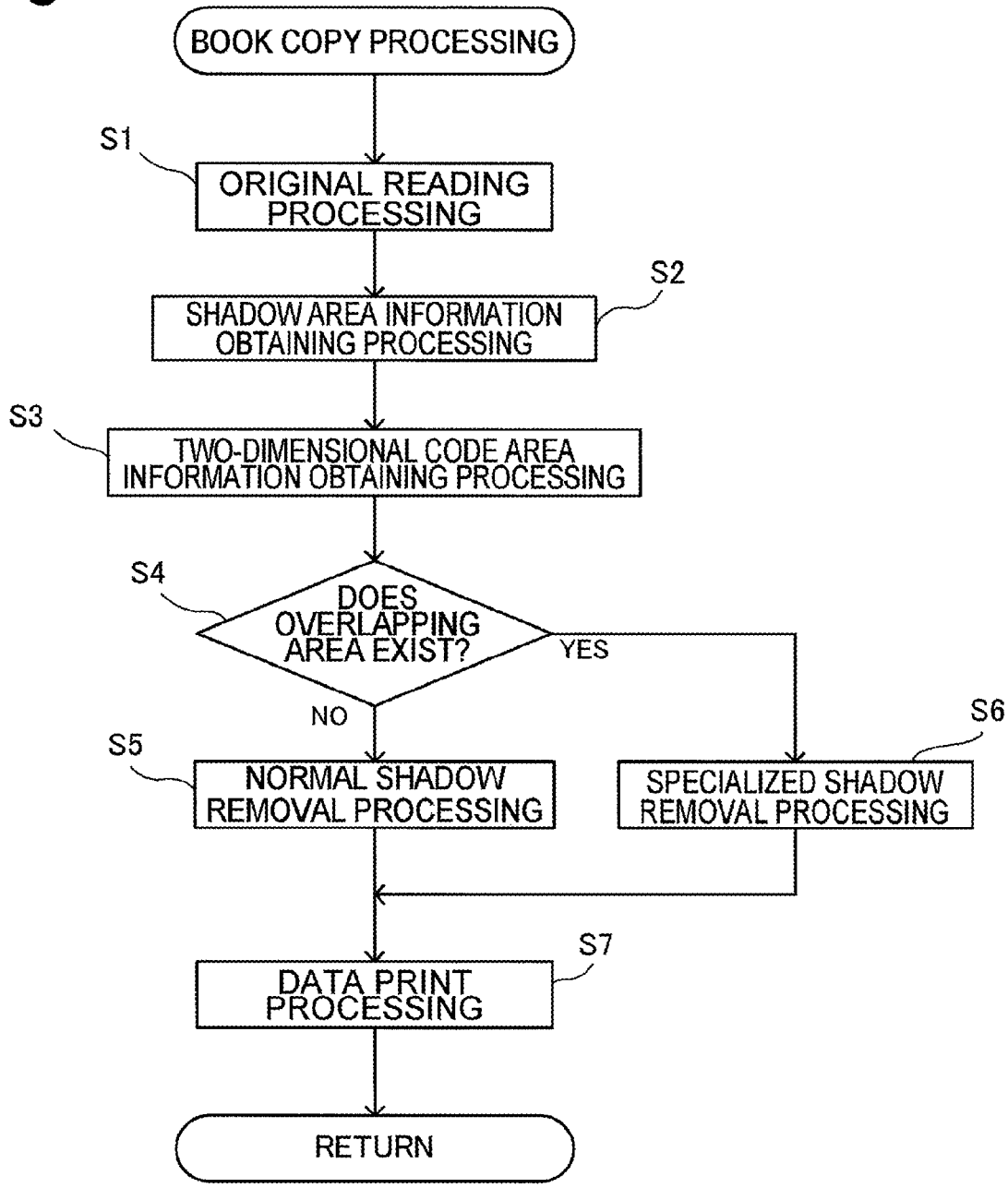
FIG. 5 is a flowchart of an illustrative copy processing program according to a first embodiment and a second embodiment of the present invention.

Next, the book copy processing program executed in the multi function peripheral device 1 according to the present illustrative embodiment will be described in detail with reference to the drawings. FIG. 5 is a flowchart of the book copy processing program.

Figure 6:
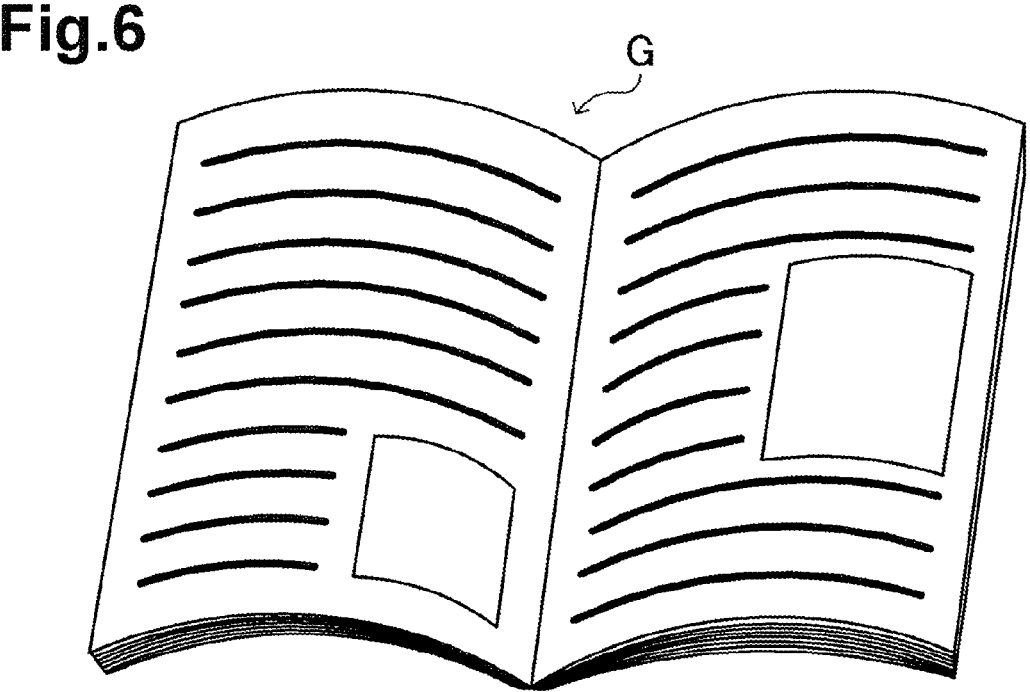
FIG. 6 is an explanatory diagram of an example of a book original which is a target of book copying.

The book copy processing program is executed when book copy which is one of the copy functions of the multi function peripheral device 1 is carried out. Herein, book copy is a copy mode in which the book original G illustrated in FIG. 6 is set as a copy target. As illustrated in FIG. 6, the book original G is obtained by binding a plurality of original pages at a binding part. For example, the book original G may be a book, a magazine, a notebook, or the like.

Then, according to the present illustrative embodiment, when the book copy is carried out, the book original G is placed on the original reading flatbed 6 in a state where the book original G is opened, and two pages on the left and right sides in this state are set as copy targets. That is, according to the present illustrative embodiment, in a case where the book copy is executed, the image data of two pages on the left and right sides of the book original G is output to one recording medium (e.g., sheet of paper).

As described above, the book original G has the binding part (refer to FIG. 6), and a part corresponding to the binding part, which is raised above the surface of the original reading flatbed 6 (the platen glass 12). As a result, when the book copy is carried out on the book original G, at the time of reading the image data by the scanner 3, a shadow is generated in the binding part. Therefore, as illustrated in FIG. 7, at the time the scanner 3 stops reading, the image data of the book original has shadow data based on the binding part in a boundary part between the two pages on the left and right sides (that is, the part equivalent to the binding part).

The book copy processing program according to the present illustrative embodiment is a control program related to removal of the shadow data generated by the binding part when the book copy is carried out on the book original G.

It should be noted that for the start of executing the book copy processing program, the book original G is supposed to be set on the original reading flatbed When execution of the book copy processing program is started, first, the CPU 21 executes the original reading processing (S1). In the original reading processing (S1), the CPU 21 allows the scanner 3 to read the book original G placed on the original reading flatbed 6. Then, the CPU 21 stores the image data of the book original read by the scanner 3 in the image memory 23A. After the image data is stored in the image memory 23A, the CPU 21 shifts the processing to S2.

Figure 7:
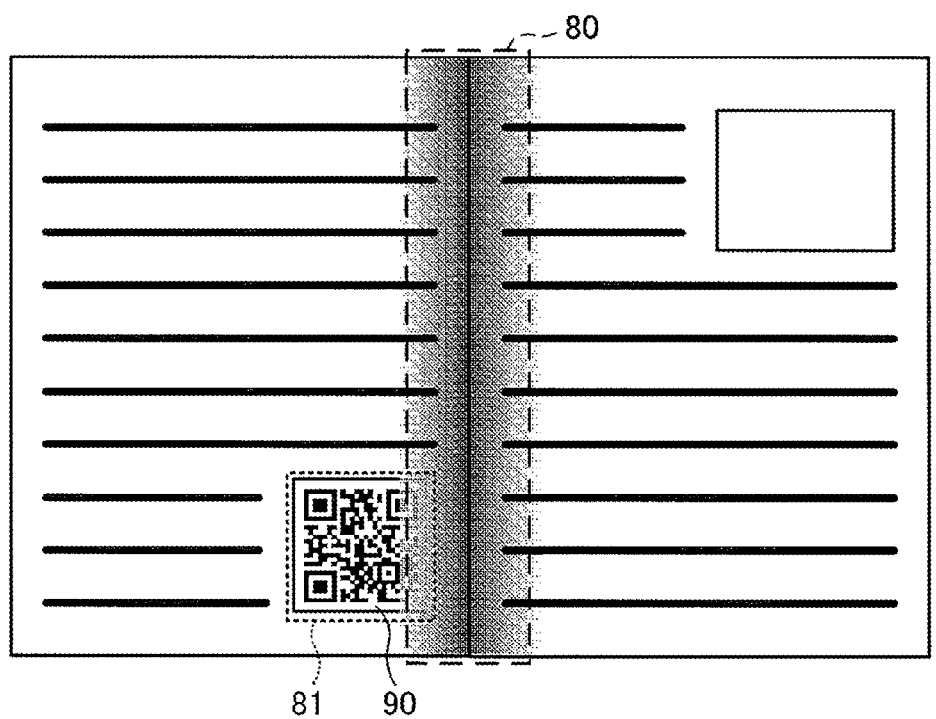
FIG. 7 shows an example of illustrative image data of book original immediately after being read by the scanner.

It should be noted that at the end of the original reading processing (S1), the image data stored in the image memory 23A has shadow data at a central part of the image data (that is, the binding part of the book original G) (refer to FIG. 7).

When the processing is shifted to S2, the CPU 21 executes a shadow area information obtaining processing. In this shadow area information obtaining processing (S2), the CPU 21 refers to the image data stored in the image memory 23A. As illustrated in FIG. 7, in the image data stored in the image memory 23A, the density of the pixel equivalent to the shadow part is higher than that of another original part (that is to say, a part contacting the platen glass 12). Therefore, on the basis of the density value of the pixels constituting the image data, the CPU 21 may identify a shadow area 80 (refer to FIG. 7). Then, the CPU 21 obtains shadow area information including the density of the respective pixels constituting the shadow area and the position of the shadow area in the image data to be stored in the RAM 23. After the shadow area information is stored in the RAM 23, the CPU 21 shifts the processing to S3.

In S3, the CPU 21 executes a two-dimensional code area information obtaining processing. In the two-dimensional code area information obtaining processing (S3), the CPU 21 refers to the image data stored in the image memory 23A to determine the presence or absence of a two-dimensional code 90 in the image data and also obtains two-dimensional code area information. The two-dimensional code area information is composed of the area occupied by the two-dimensional code 90 in the image data, the position, the density values of the pixels constituting the two-dimensional code 90, and the like.

Figures 8, 9:
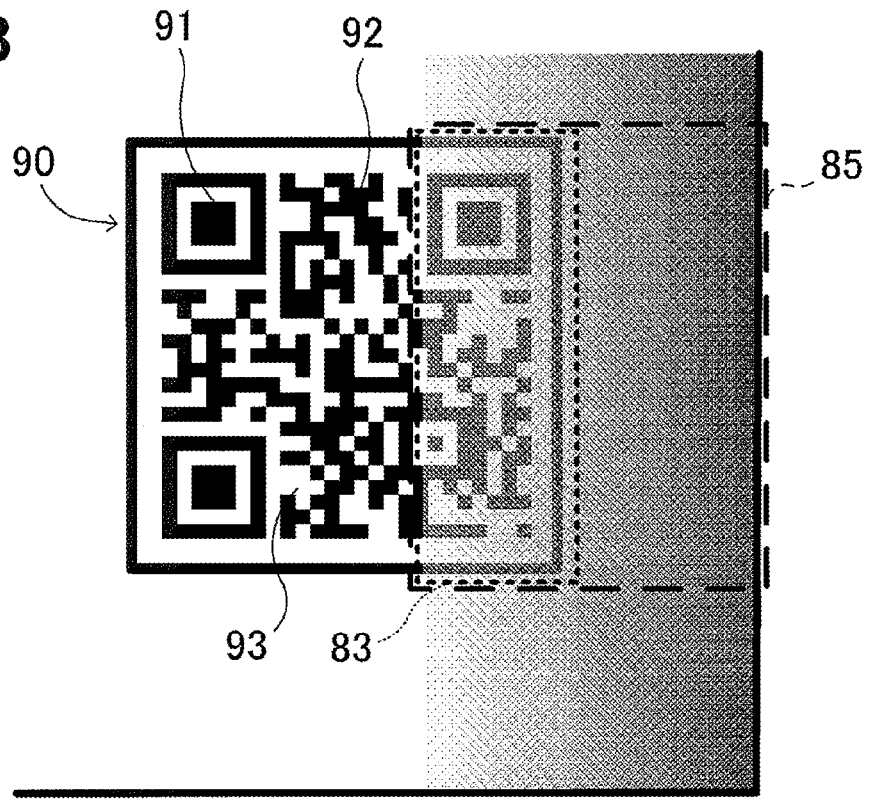
FIG. 8 shows a configuration of a two-dimensional code, an overlapping area, and a specific area according to illustrative aspects.
FIG. 9 illustrates memory content of a density conversion table storage area.

As illustrated in FIG. 8, the two-dimensional code 90 is composed by arranging black cells 92 and white cells 93 in a matrix. Then, the arrangement of the black cells 92 and the white cells 93 in the two-dimensional code 90 is determined by the underlying information. That is, the two-dimensional code 90 generated by encoding predetermined information is read by using a predetermined reading apparatus (for example, a two-dimensional code reader or the like) and decoded, so that it is possible to obtain the predetermined information. In one illustrative aspect, the user can cause the two-dimensional code to be read by the reading apparatus and decode the code.

In addition, the two-dimensional code 90 has finder patterns 91 at its corners (refer to FIG. 8). The finder patterns 91 are used for detecting the position at the time of reading by the reading apparatus. That is, by identifying the positions of the finder patterns 91, the position of the two-dimensional code 90 and the area occupied by the two-dimensional code 90 (that is, a two-dimensional code area 81) may be identified. It should be noted that information related to the finder patterns 91 and information related to the positional relation between the finder patterns 91 and the two-dimensional code 90 (information on a standard arrangement relation) are previously stored in the ROM 22 or the like. Then, by using these pieces of information, the processing in S3 is executed.

In the two-dimensional code area information obtaining processing (S3), first, the CPU 21 extracts the finder patterns 91 from the image data in the image memory 23A. When the finder patterns 91 can be extracted, it is understood that the two-dimensional code is included in the image data. Then, the CPU 21 may identify the two-dimensional code area 81 in the image data from the positions of the finder patterns 91 (refer to FIG. 7). Then, the CPU 21 may obtain the density value of the pixels constituting the identified two-dimensional code area 81. In this manner, when the two-dimensional code area information is obtained, the CPU 21 stores the thus obtained two-dimensional code area information in the RAM 23 and shifts the processing to S4.

When the processing is shifted to S4, the CPU 21 determines whether or not an overlapping area 83 exists in the image data. Herein, the overlapping area 83 is where the shadow area 80 is overlapped with the two-dimensional code area 81 in the image data (refer to FIGS. 7 and 8). That is to say, the case where the overlapping area 83 exists refers to a case where the two-dimensional code 90 is placed in the vicinity of the binding part of the book original G and the shadow based on the binding part invades the two-dimensional code 90.

As described above, the shadow area information and the two-dimensional code area information includes data related to the position and the area in the image data. Therefore, by referring to the shadow area information and the two-dimensional code area information stored in the RAM 23, the CPU 21 may determine if the overlapping area 83 exists. In a case where the overlapping area 83 exists in the image data, (S4: YES), the CPU 21 shifts the processing to S6. On the other hand, in a case where the overlapping area 83 does not exist in the image data (S4: NO), the CPU 21 shifts the processing to S5.

In S5, the CPU 21 executes a normal shadow removal processing. This normal shadow removal processing (S5) is executed, as described above, in a case where the overlapping area 83 does not exist in the image data in the image memory 23A. That is, in this case, even when the removal of the shadow data is performed, the two-dimensional code 90 is not damaged, and thus the CPU 21 performs the removal of the shadow data while the entire shadow area 80 is set as a target. According to the present illustrative embodiment, the CPU 21 converts the density of the pixel belonging to the shadow area 80 on the basis of the density conversion table stored in the density conversion table storage area 22A to perform the removal of the shadow data. After the normal shadow removal processing (S5) is ended, the CPU 21 shifts the processing to S7.

Herein, the density conversion table stored in the density conversion table storage area 22A will be described in detail with reference to the drawings. As illustrated in FIG. 9, five types of density conversion patterns including a density conversion pattern (1) to a density conversion pattern (5) are stored in the density conversion table storage area 22A. These density conversion patterns are respectively associated with mutually different removal thresholds and shadow removal levels.

The removal threshold indicates the density of the pixel and indicates a threshold of an input density for outputting a density indicating white after the density conversion (that is, the density of the target pixel in the image data). That is, in a case where the input density indicates the pixel is whiter than the removal threshold (that is, in a case where the pixel density is low), the CPU 21 outputs the density indicating white as the output density. Then, in a case where the input density is blacker than the removal threshold (that is, in a case where the pixel density is high), the CPU 21 outputs the density which is the same as the input density as the output density (FIGS. 10A and 10B).

Figure 10A:
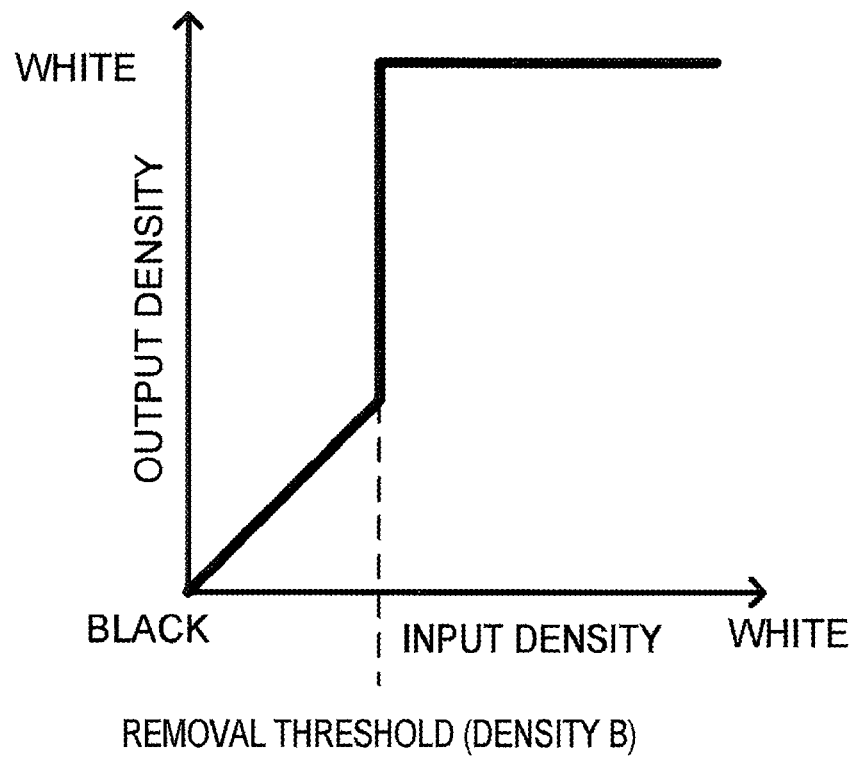
FIGS. 10A and 10B are graphs related to density conversion based on a density conversion table.
Figure 10B:
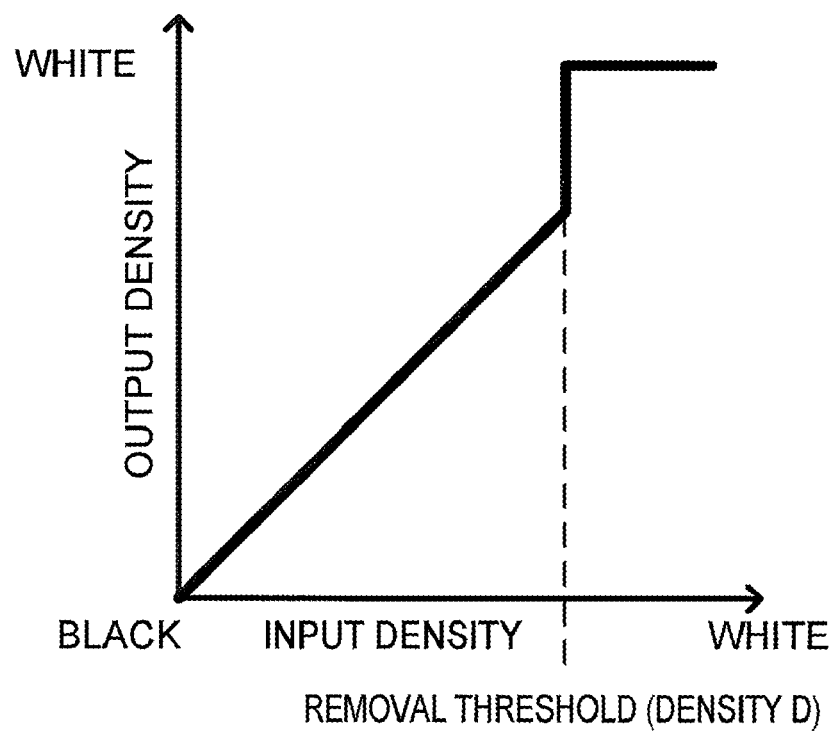

With reference to examples illustrated in FIGS. 10A and 10B, the density conversion based on the density conversion table will be specifically described. For example, in a density conversion pattern (2), a density B is the corresponding removal threshold (refer to FIGS. 9 and 10A).

In a case where a density of a given pixel (input density) is whiter than the density B which is the removal threshold, but the input density itself contains some black components, the CPU 21 converts the input density of the pixel into an output density of the pixel indicating white and outputs the output density. In addition, in a case where a density of a given pixel indicates a density blacker than the density B which is the removal threshold, the CPU 21 directly outputs the input density as the output density.

That is to say, in a case where the removal of the shadow data is performed through the density conversion based on the density conversion pattern (2), in the shadow area in the image data, pixels having a density equal to or lower than the density B are all converted into white pixels.

Then, in a density conversion pattern (5) which is different from the density conversion pattern (2), a density D is the corresponding removal threshold. As illustrated in FIGS. 10A and 10B, the removal threshold (the density D) according to the density conversion pattern (5) is set as a pixel density whiter than the density B according to the density conversion pattern (2) (refer to FIGS. 10A and 10B). Therefore, in a case where the density conversion is performed on the basis of the density conversion pattern (5), the number of pixels to be converted into white pixels is decreased as compared with the density conversion performed on the basis of the density conversion pattern (2). In other words, the number of pixels whose input density is maintained as the output density for the output pixel is increased, and a degree of removing the shadow data from the image data is lowered.

As illustrated in FIG. 9, mutually different removal thresholds (densities A to E) are associated with density conversion patterns (1) to (5). Then, the density A to the density E are prescribed as densities from near black to near white, respectively. Therefore, the five types of the density conversion patterns in the density conversion table storage area 22A are prescribed as mutually different degrees for shadow removal.

Then, as described above, "removal level: +2", "removal level: +1", "removal level: 0", "removal level: −1", and "removal level: −2" respectively correspond to density conversion pattern (1) to density conversion pattern (5). The larger the removal level, the higher degree for shadow removal. This point can be easily understood from the relation between the removal level and the removal threshold. Then, the concept of the removal level can be used, for example, in a case where the user arbitrarily sets the degree for shadow removal. It should be noted that the density conversion pattern (3) is set as an initial setting according to the present illustrative embodiment (that is, "removal level: 0").

Figure 11:
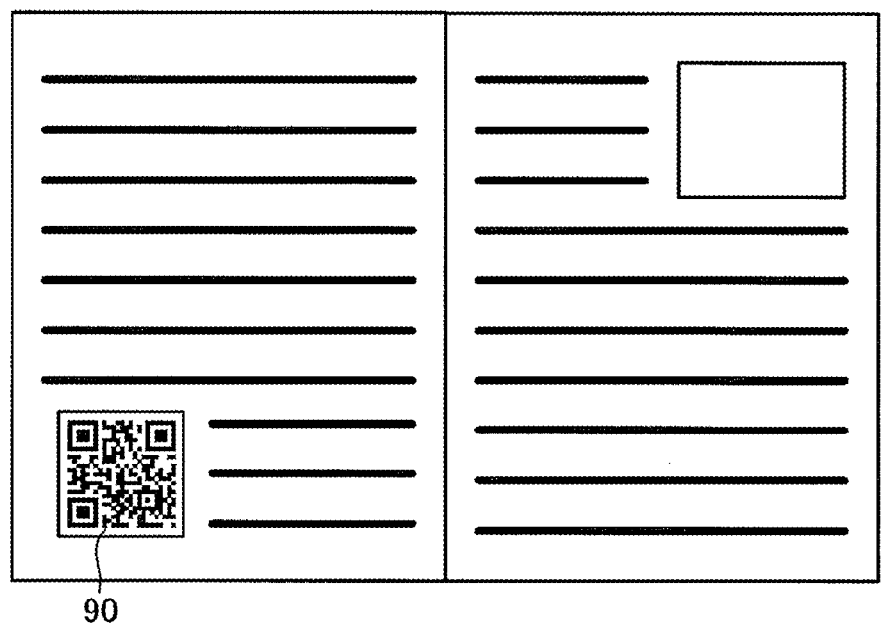
FIG. 11 shows an illustrative output result of image data in which shadow removal is performed through a normal shadow removal operation.

In the normal shadow removal processing (S5), the CPU 21 reads the density conversion pattern set as the user setting or the initial setting, and on the basis of the density conversion pattern, all the pixel densities in the shadow area 80 are converted. With this configuration, the pixels having densities lower than the removal threshold are all converted into white pixels. Thus, the CPU 21 may convert the pixel densities in the shadow area 80 of the image data into white pixels and remove the shadow data based on the binding part from the image data (refer to FIG. 11). In this case, as the overlapping area 83 does not exist, the two-dimensional code is not damaged by removal of the shadow data. Therefore, as illustrated in FIG. 11, after the normal shadow removal processing (S5) ends, the fine image data including the two-dimensional code 90 and having the shadow data removed is stored in the image memory 23A.

On the other hand, in S6, the CPU 21 executes a specialized shadow removal processing. The specialized shadow removal processing (S6) is executed in a case where the overlapping area 83 exists in the image data in the image memory 23A. To be more specific, in the specialized shadow removal processing (S6), first, the CPU 21 identifies the overlapping area 83 in the image data on the basis of the shadow area information and the two-dimensional code area information. Then, the CPU 21 selects a specific area 85 on the basis of the position of the identified overlapping area 83 or the like.

Herein, the specific area 85 includes the overlapping area 83 and constitutes a part of the shadow area 80 which is defined by the position and size of the overlapping area 83. For example, the specific area 85 in the example illustrated in FIG. 8 constitutes a part of the shadow area 80 and has the same dimension as the longitudinal dimension of the overlapping area 83 and a transversal dimension from the border of the overlapping area 83 to a position equivalent to the binding part of the book original G. Therefore, the CPU 21 can identify the specific area 85 on the basis of the position, size, and the like of the overlapping area 83.

Figure 12:
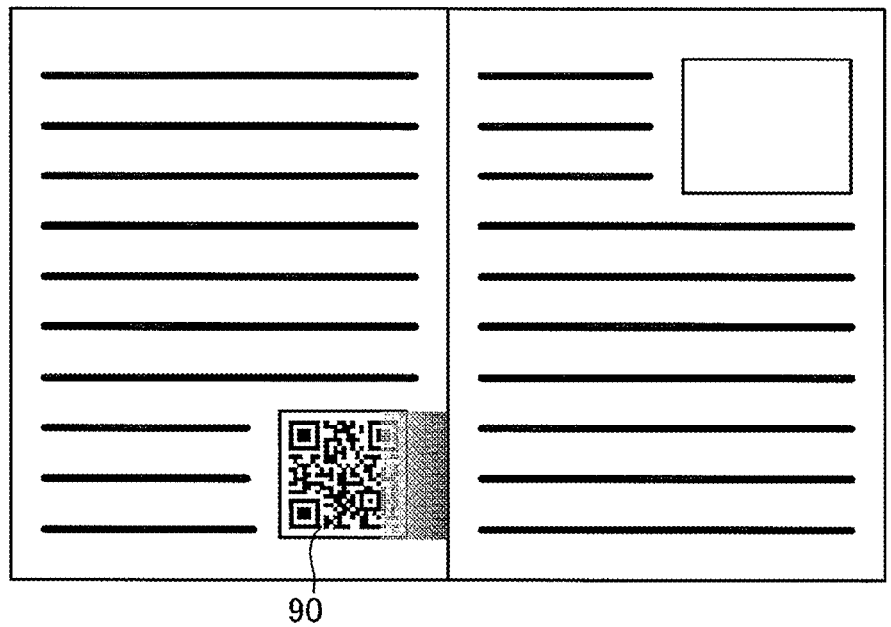
FIG. 12 shows an illustrative output result of image data in which shadow removal is performed in a case where the overlapping area does not exist.

Then, after identifying the specific area 85, the CPU 21 converts the densities of the pixels constituting the shadow area 80 other than the specific area 85 on the basis of the set density conversion patterns. Thus, the shadow data existing in an area outside the specific area 85 in the shadow area 80 (hereinafter, referred to as nonspecific area) is removed from the image data (refer to FIG. 12). With this configuration, the shadow data in the nonspecific area is removed from the image data including the shadow area 80 based on the binding part (refer to FIG. 7) through the specialized shadow removal processing (S6). Such a state is established that the specific area 85 has the shadow. Therefore, in the image data, a fine state in which the shadow data is removed is established in the nonspecific area part. Then, the shadow remains to be removed with respect to the specific area 85, but the two-dimensional code 90 is not damaged along with the shadow removal. That is, after the specialized shadow removal processing (S6) ends, the image data in which the shadow data is removed from the nonspecific area part is stored in the image memory 23A while the two-dimensional code 90 is kept in a state where the information can be read (refer to FIG. 12).

After the specialized shadow removal processing (S6), the CPU 21 shifts the processing to S7.

It should be noted that in this specialized shadow removal processing (S6), the removal of the shadow is restricted or prevented in the specific area. That is, the target area of the shadow removal in the specialized shadow removal processing (S6) is the shadow area 80 except for the specific area 85. In other words, the specialized shadow removal processing (S6) imposes a restriction on the ability to remove the shadow in the specific area 85.

In S7, the CPU 21 executes a data print processing. In the data print processing (S7), the CPU 21 reads the image data from the image memory 23A, and applies the print on a recording sheet on the basis of the image data through the printer 2. Herein, the image data printed on the recording sheet in the data print processing (S7) is the data that has been subjected to the normal shadow removal processing (S5) or the specialized shadow removal processing (S6) (refer to FIGS. 11 and 12). Therefore, by executing the data print processing (S7), the multi function peripheral device 1 can provide the user the output result in which the two-dimensional code 90 is readable and the shadow based on the binding part of the book original G is appropriately removed. When the data print processing (S7) ends, the CPU 21 ends the book copy processing program.

As described above, with the multi function peripheral device 1 and the book copy processing program according to the first illustrative embodiment, when the book copy is carried out on the book original G having the binding part by converting the pixel density on the basis of the density conversion table, the shadow data generated on the basis of the binding part is removed from the image data related to the book original G.

Herein, in a case where the book original G contains the two-dimensional code 90 and no overlapping area 83 exists where the shadow area 80 is not overlapped with the two-dimensional code area 81 (S4: NO), the CPU 21 executes the normal shadow removal processing (S5). In this case, even when the data removal is performed with respect to the image data, the two-dimensional code 90 is not damaged through the removal of the shadow data. Therefore, the multi function peripheral device 1 and the book copy processing program may provide the fine output result in which the two-dimensional code 90 is maintained so that the information can be read and the shadow based on the binding part of the book original G is removed.

Then, in a case where the book original G contains the two-dimensional code 90 and the overlapping area 83 where the shadow area 80 is overlapped with the two-dimensional code area 81 exists (S4: YES), the CPU 21 executes the specialized shadow removal processing (S6). In the specialized shadow removal processing (S6), the removal of the shadow in the specific area 85 is restricted, and the removal of the shadow is performed with respect to the nonspecific area. As the removal of the shadow in the specific area 85 is restricted, the multi function peripheral device 1 and the book copy processing program may provide the output result in a state where the two-dimensional code 90 is readable while preventing the two-dimensional code 90 from being damaged due to the shadow removal. Then, to execute the removal of the shadow in the nonspecific area, the multi function peripheral device 1 and the book copy processing program may provide the output result in which the shadow based on the binding part of the book original G is removed.

It should be noted that in the specialized shadow removal processing (S6) according to the first illustrative embodiment, as the removal of the shadow in the specific area 85 is restricted, the removal of the shadow in the specific area 85 is limited, but the present invention is not limited to this mode. For example, such a configuration is also conceivable that at the time of the shadow removal with respect to the specific area 85, the density conversion pattern used for the shadow removal is changed into a density conversion pattern for milder shadow removal (that is, the density conversion) to execute the shadow removal. It should be noted that the shadow removal is performed in the nonspecific area on the basis of the density conversion pattern before the change. That is to say, in this case, the shadow removal itself is performed over the entire shadow area, but the shadow removal with respect to the specific area 85 is limited to shadow removal in which the degree of the shadow removal is mild. For example, such a configuration is also conceivable that the shadow removal is performed in the nonspecific area on the basis of the density conversion pattern at the removal level "+1" in FIG. 9, and the shadow removal is performed in the specific area 85 on the basis of the density conversion pattern at the removal level "−1". That is to say, the shadow removal with respect to the specific area 85 and the shadow removal with respect to the nonspecific area may also be executed on the basis of the different shadow removal levels.

In addition, the density conversion pattern used for the normal shadow removal processing (S5) and the specialized shadow removal processing (S6) is not limited to the mode in which the density conversion pattern can be selected by the user, but the fixed density conversion pattern determined on the shadow removal apparatus side may be used to perform the shadow removal.

Second Illustrative Embodiment

Next, an illustrative embodiment which is different from the first illustrative embodiment described above (a second embodiment) will be described in detail with reference to the drawings. According to the second illustrative embodiment, the basic configuration of the multi function peripheral device 1 and the basis processing content of the book copy processing program are the same as those of the first illustrative embodiment, and only a content of the specialized shadow removal processing (S6) in the book copy processing program is different. Therefore, according to the second illustrative embodiment, the content of the specialized shadow removal processing (S6) will be described in detail.

In the multi function peripheral device 1 according to the second illustrative embodiment, when the book copy processing program is executed, the CPU 21 executes the original reading processing (S1), the shadow area information obtaining processing (S2), the two-dimensional code area information obtaining processing (S3), the determination processing in S4, and the normal shadow removal processing (S5). These processings in S1 to S5 have been already described according to the first illustrative embodiment, and detailed descriptions thereof will be omitted.

When it is determined that the overlapping area 83 exists (S4: YES) and the processing is shifted to S6, the CPU 21 of the multi function peripheral device 1 according to the second illustrative embodiment executes the specialized shadow removal processing. In the specialized shadow removal processing (S6) according to the second illustrative embodiment, the CPU 21 restricts the removal of the shadow data in the image data itself (that is, the density conversion of the pixels constituting the image based on the density conversion table). That is to say, according to the second illustrative embodiment, the image data stored through the original reading processing (S1) in the image memory 23A is still stored as it is after the specialized shadow removal processing (S6) is ended (refer to FIG. 7). Therefore, according to the multi function peripheral device 1 according to the second illustrative embodiment, although the shadow removal is not performed, by executing the data print processing (S7), the user may obtain the output result in such a state that the information of the two-dimensional code 90 can be read (refer to FIG. 7).

As described above, in the multi function peripheral device 1 and the book copy processing program according to the second illustrative embodiment, when the book copy is carried out on the book original G having the binding part, through the conversion of the pixel density on the basis of the density conversion table, the shadow data generated through the binding part is removed from the image data of the book original G. In a case where the book original G contains the two-dimensional code 90 but no overlapping area 83 exists where the shadow area 80 is overlapped with the two-dimensional code area 81 (S4: NO), similarly to the first illustrative embodiment, the CPU 21 executes the normal shadow removal processing (S5). Therefore, the multi function peripheral device 1 and the book copy processing program may provide the fine output result in which the two-dimensional code 90 is maintained so that the information can be read and the shadow based on the binding part is removed.

Then, according to the second illustrative embodiment as well, the book original G contains the two-dimensional code 90, and in a case where the overlapping area 83 where the shadow area 80 is overlapped with the two-dimensional code area 81 exists (S4: YES), the CPU 21 executes the specialized shadow removal processing (S6). In the specialized shadow removal processing (S6), the removal of the shadow data in the image data (that is, the removal of the shadow for the entire shadow area 80) is restricted. Therefore, in the multi function peripheral device 1 and the book copy processing program according to the second illustrative embodiment, the book copy processing is facilitated, and also the two-dimensional code in the image data is not damaged. That is, according to the multi function peripheral device 1 and the book copy processing program, it is possible to provide the user the output result in such a state that the information based on the two-dimensional code can be read. In addition, due to the positional relation between the shadow generated through the binding part and the two-dimensional code, the shadow removal mode by the shadow removal unit is changed, and thus the multi function peripheral device 1 and the book copy processing program may provide the user the output result in which the shadow removal is performed in a more appropriate manner.

Third Illustrative Embodiment

Subsequently, an illustrative embodiment which is different from the first and second illustrative embodiments described above (a third illustrative embodiment) will be described in detail with reference to the drawings. The multi function peripheral device 1 according to the third illustrative embodiment has a similar configuration to that of the multi function peripheral device 1 according to the first illustrative embodiment, and only a processing content of the book copy processing program is different. Therefore, the book copy processing program according to the third illustrative embodiment will be described with reference to FIG. 13, and descriptions related to the configuration and the like of the multi function peripheral device 1 will be omitted.

It should be noted that in the multi function peripheral device 1 according to the third illustrative embodiment, the user may select a desired removal level from among "removal level: +2" to "removal level: −2" and change the setting to the selected removal level. That is, the user may select the desired density conversion pattern from among five types of density conversion patterns stored in the density conversion table storage area 22A to be set as the density conversion pattern used for shadow removal. The information indicating the density conversion pattern set by the user is stored in the user setting storage area 24A. Regarding this point, the initial setting in the multi function peripheral device 1 is "removal level: 0" (that is, the density conversion pattern (3)).

In the multi function peripheral device 1 according to the third illustrative embodiment, when the execution of the book copy processing program is started, first, the CPU 21 executes the original reading processing (S11), the shadow area information obtaining processing (S12), and the two-dimensional code area information obtaining processing (S13). These processings in S11 to S13 are similar to the original reading processing (S1), the shadow area information obtaining processing (S2), and the two-dimensional code area information obtaining processing (S3) according to the first illustrative embodiment. Therefore, descriptions related to the processings in S11 to S13 will be omitted. After the two-dimensional code area information obtaining processing (S13) is ended, the CPU 21 shifts the processing to S14.

When the processing is shifted to S14, the CPU 21 determines whether or not the overlapping area 83 exists in the image data read by the scanner 3. The determination as to the presence or absence of the overlapping area 83 is performed in a similar manner to S4 according to the first illustrative embodiment. In a case where the overlapping area 83 exists (S14: YES), the CPU 21 shifts the processing to S15. On the other hand, in a case where the overlapping area 83 does not exist (S14: NO), the CPU 21 shifts the processing to the normal shadow removal processing (S20).

In S15 which is executed in a case where the overlapping area 83 exists in the image data, the CPU 21 executes a shadow density calculation processing. In the shadow density calculation processing (S15), the CPU 21 calculates the shadow density on the basis of the densities of the pixels located in the vicinity of, but not overlapping, the two-dimensional code 90 in the image data. With reference to FIG. 8, vicinity encompasses the portion of specific area 85, which does not include overlapping area 83.

Herein, the pixels located in the vicinity of the two-dimensional code 90 in this shadow density calculation processing (S15) (hereinafter, referred to as target pixel group) are pixels which are not relevant to the overlapping area 83 in the vicinity of the border of the two-dimensional code area 81 in the specific area 85 (for example, for several pixels). Therefore, by referring to the shadow area information and the two-dimensional code area information, the CPU 21 can identify the target pixel group. Then, on the basis of the image data, the CPU 21 obtains the densities of the pixels constituting the target pixel group to calculate an average value of the density values of pixels constituting the target pixel group as the shadow density. After the calculated shadow density is stored in the RAM 23, the CPU 21 shifts the processing to S16.

When the processing is shifted to S16, the CPU 21 executes a two-dimensional code density calculation processing. In this two-dimensional code density calculation processing (S16), the CPU 21 obtains an average value of the density values of pixels equivalent to the black cells 92 part in the two-dimensional code area 81, and the thus obtained average value of the density values as the two-dimensional code density. After the calculated two-dimensional code density is stored in the RAM 23, the CPU 21 shifts the processing to S17.

Subsequently, in S17, the CPU 21 executes a density conversion pattern decision processing. In this density conversion pattern decision processing (S17), the CPU 21 selects a density conversion pattern to be used for the shadow removal in the overlapping area 83 and the specific area 85 in the image data on the basis of the shadow density and the two-dimensional code density stored in the RAM 23.

To be more specific, the CPU 21 calculates, first, a two-dimensional code density and a target density which is an average value of the shadow densities. Then, the CPU 21 compares the target density with the removal thresholds associated with the respective density conversion patterns. After that, the CPU 21 selects the density conversion pattern related to the removal threshold having the density value which is closest to the target density as the density conversion pattern used for the shadow removal in the overlapping area 83 and the specific area 85 in the image data. The information indicating the selected density conversion pattern is stored in the RAM 23, and thereafter the CPU 21 shifts the processing to S18.

When the processing is shifted to S18, the CPU 21 executes a nonspecific area shadow removal processing. As described above, the CPU 21 can identify the specific area 85 on the basis of the shadow area information and the two-dimensional code area information, and thus may also identify the nonspecific area. In this nonspecific area shadow removal processing (S18), the CPU 21 executes the processing of removing the shadow data from the nonspecific area in the image data. To be more specific, the CPU 21 reads the image data stored in the image memory 23A, and converts the density of the respective pixels belonging to the nonspecific area on the basis of the density conversion pattern set by the user or the density conversion pattern related to the initial setting. After the image data after the density conversion is stored in the image memory 23A again, the CPU 21 shifts the processing to S19.

In S19, the CPU 21 executes a specific area shadow removal processing. In the specific area shadow removal processing (S19), the CPU 21 removes the shadow in the specific area 85 where the shadow removal through the nonspecific area shadow removal processing (S18) is not performed. To be more specific, the CPU 21 reads, first, the image data stored in the image memory 23A (that is, the image data having been subjected to the nonspecific area shadow removal processing (S18)). Then, the CPU 21 refers to the RAM 23 to convert the density of the respective pixels belonging to the specific area 85 in the image data on the basis of the density conversion pattern selected through the density conversion pattern decision processing (S17). The image data after the density conversion is stored in the image memory 23A again, and thereafter the CPU 21 shifts the processing to S21.

By executing the specific area shadow removal processing (S19), the image data is put into a state where the two-dimensional code can be read with certainty and also the shadow is removed. As described above, the two-dimensional code density is a density of the black cells 92 part constituting the two-dimensional code 90, and the shadow density is a density of the target pixel group located in the vicinity of the two-dimensional code 90. Herein, the target pixel group is a pixel group containing a large number of pixels based on the page background color of the book original G. Therefore, even when the shadow exists, the shadow density is lower than the two-dimensional code density (that is, a density closer to the white).

In this way, the target density calculated through the density conversion pattern decision processing (S17) is lower than the two-dimensional code density (that is, a density closer to the white) and also higher than the shadow density (that is, a density closer to the black). Herein, in the density conversion pattern decision processing (S19), the CPU 21 selects and decides the density conversion pattern which is associated with the removal threshold closest to the calculated target density. That is, the density conversion pattern selected through the density conversion pattern decision processing (S17) is associated with the removal threshold generally indicating the lower density than the two-dimensional code density and also indicating the higher density than the shadow density.

Then, according to the density conversion based on the density conversion pattern, the pixels having the density lower than the removal threshold are converted into the white pixels to be output, and the pixels having the density higher than the removal threshold are output while the densities are kept without change (refer to FIGS. 10A and 10B).

Therefore, when the removal of the shadow data is performed with respect to the specific area 85 of the image data on the basis of the density conversion pattern selected through the density conversion pattern decision processing (S17), as the shadow density has the density lower than the removal threshold, the shadow existing in the image data is substantially removed. As a result, when the removal of the shadow in the specific area 85 is performed on the basis of the density conversion pattern selected through the density conversion pattern decision processing (S17), the multi function peripheral device 1 according to the third illustrative embodiment may output the fine image from which the shadow existing in the specific area 85 is substantially removed.

On the other hand, as the two-dimensional code density has the density higher than the removal threshold, the pixels equivalent to the black cells 92 of the two-dimensional code are output at the almost unchanged densities. Therefore, in a case where the removal of the shadow is performed by using the density conversion pattern selected through the density conversion pattern decision processing (S17), the multi function peripheral device 1 according to the third illustrative embodiment may output the output result having the two-dimensional code 90 in a state where the information from the two-dimensional code 90 can be obtained with certainty.

Herein, in S20 which is executed in a case where the overlapping area 83 does not exist in the image data (S14: NO), the CPU 21 executes the normal shadow removal processing. In the normal shadow removal processing (S20), the CPU 21 refers to the user setting storage area 24A and performs the removal of the shadow data in the image data on the basis of the density conversion pattern based on the user setting. As to this point, the normal shadow removal processing (S20) is similar to the normal shadow removal processing (S6) according to the first illustrative embodiment except that the density conversion pattern based on the user setting is used. Therefore, a detailed description about the processing content in the normal shadow removal processing (S20) will be omitted.

By executing this normal shadow removal processing (S20), the multi function peripheral device 1 according to the third illustrative embodiment can perform the removal of the shadow with respect to the image data of the book original at the removal level desired by the user (that is, the density conversion pattern).

Then, in S21, the CPU 21 executes the data print processing. In this data print processing (S21), the CPU 21 outputs the recording sheet on which the print based on the image data stored in the image memory 23A is performed. After the image data is printed and output on the recording sheet, the CPU 21 ends the book copy processing program.

With this configuration, the multi function peripheral device 1 may print and output the image data having been subjected to the nonspecific area shadow removal processing (S18) and the specific area shadow removal processing (S19) on the recording sheet. That is, the multi function peripheral device 1 may provide the user the output result having the two-dimensional code 90 in a state where the information can be read with certainty and in which the shadow data in the image data is appropriately removed.

In addition, also in a case where the image data having been subjected to the normal shadow removal processing (S20) is output, the multi function peripheral device 1 performs the shadow removal on the basis of the user setting, and thus the output result in which the shadow removal desired by the user is performed may be provided.

As described above, in a case where the overlapping area 83 exists in the image data, (S14: YES), the multi function peripheral device 1 and the book copy processing program according to the third illustrative embodiment selects the density conversion pattern on the basis of the shadow density and the two-dimensional code density (S17), and perform the removal of the shadow in the specific area 85 data by using the density conversion pattern. As a result, as described above, the multi function peripheral device 1 and the book copy processing program according to the third illustrative embodiment may provide the user the output result which has the two-dimensional code 90 in the readable state and also in which the removal of the shadow in the specific area 85 is appropriately performed. Then, in this case, the removal of the shadow based on the user setting is performed with respect to the nonspecific area, and therefore the multi function peripheral device 1 and the book copy processing program according to the third illustrative embodiment may provide the output result in which the shadow removal desired by the user is performed to the user. It should be noted that the density conversion pattern selected on the basis of the shadow density and the two-dimensional code density corresponds to the reset density conversion pattern.

In addition, the multi function peripheral device 1 and the book copy processing program according to the third illustrative embodiment execute the removal of the shadow data with respect to the image data on the basis of the density conversion pattern related to the user setting in a case where the overlapping area 83 does not exist in the image data (S14: NO). Therefore, according to the multi function peripheral device 1 and the book copy processing program, the user can obtain the output result in which the desired shadow removal is performed.

It should be noted that according to the third illustrative embodiment, the two-dimensional code density and the average value of the shadow densities are set as the target density, and the density conversion pattern related to the removal threshold closest to the target density is set as the density conversion pattern for the shadow removal in the specific area 85, but the present invention is not limited to this mode. For example, the shadow density may be set as the target density. That is, such a configuration can also be adopted that the density conversion pattern related to the removal threshold closest to the shadow density may be set as the density conversion pattern for the shadow removal in the specific area 85.

Fourth Illustrative Embodiment

Next, an illustrative embodiment which is different from the first to third illustrative embodiments (a fourth illustrative embodiment) will be described in detail with reference to the drawings. The multi function peripheral device 1 according to the fourth illustrative embodiment has a similar configuration to the multi function peripheral device 1 according to the first illustrative embodiment, and only the processing content of the book copy processing program is different. Therefore, the book copy processing program according to the fourth illustrative embodiment will be described with reference to the drawing, and a description of the configuration or the like of the multi function peripheral device 1 will be omitted.

It should be noted that in the multi function peripheral device 1 according to the fourth illustrative embodiment as well, the degree of removing the shadow data can be changed, and the user may select a desired removal level from among "removal level: +2" to "removal level: −2" (that is, the density conversion pattern) and change the setting to the selected removal level. The information indicating the density conversion pattern set by the user is stored in the user setting storage area 24A. In this point, the initial setting in the multi function peripheral device 1 may be "removal level: 0" (that is, the density conversion pattern (3)).

In the multi function peripheral device 1 according to the fourth illustrative embodiment, when the execution of the book copy processing program is started, first, the CPU 21 executes the original reading processing (S31), the shadow area information obtaining processing (S32), and the two-dimensional code area information obtaining processing (S33). These processings in S31 to S33 are similar to the original reading processing (S1), the shadow area information obtaining processing (S2), and the two-dimensional code area information obtaining processing (S3) according to the first illustrative embodiment. Therefore, descriptions of the processings in S31 to S33 will be omitted. After the two-dimensional code area information obtaining processing (S33) is ended, the CPU 21 shifts the processing to S34.

When the processing is shifted to S34, the CPU 21 determines whether or not the overlapping area 83 exists in the image data read by the scanner 3. The determination as to the presence or absence of the overlapping area 83 is performed similarly to S4 according to the first illustrative embodiment. In a case where the overlapping area 83 exists (S34: YES), the CPU 21 shifts the processing to S35. On the other hand, in a case where the overlapping area 83 does not exist (S34: NO), the CPU 21 shifts the processing to the normal shadow removal processing (S42).

In S35, the CPU 21 executes a two-dimensional code enhancement display processing. In this two-dimensional code enhancement display processing (S35), first, the CPU 21 displays an enhancement setting screen on the LCD 41.

Figure 15:
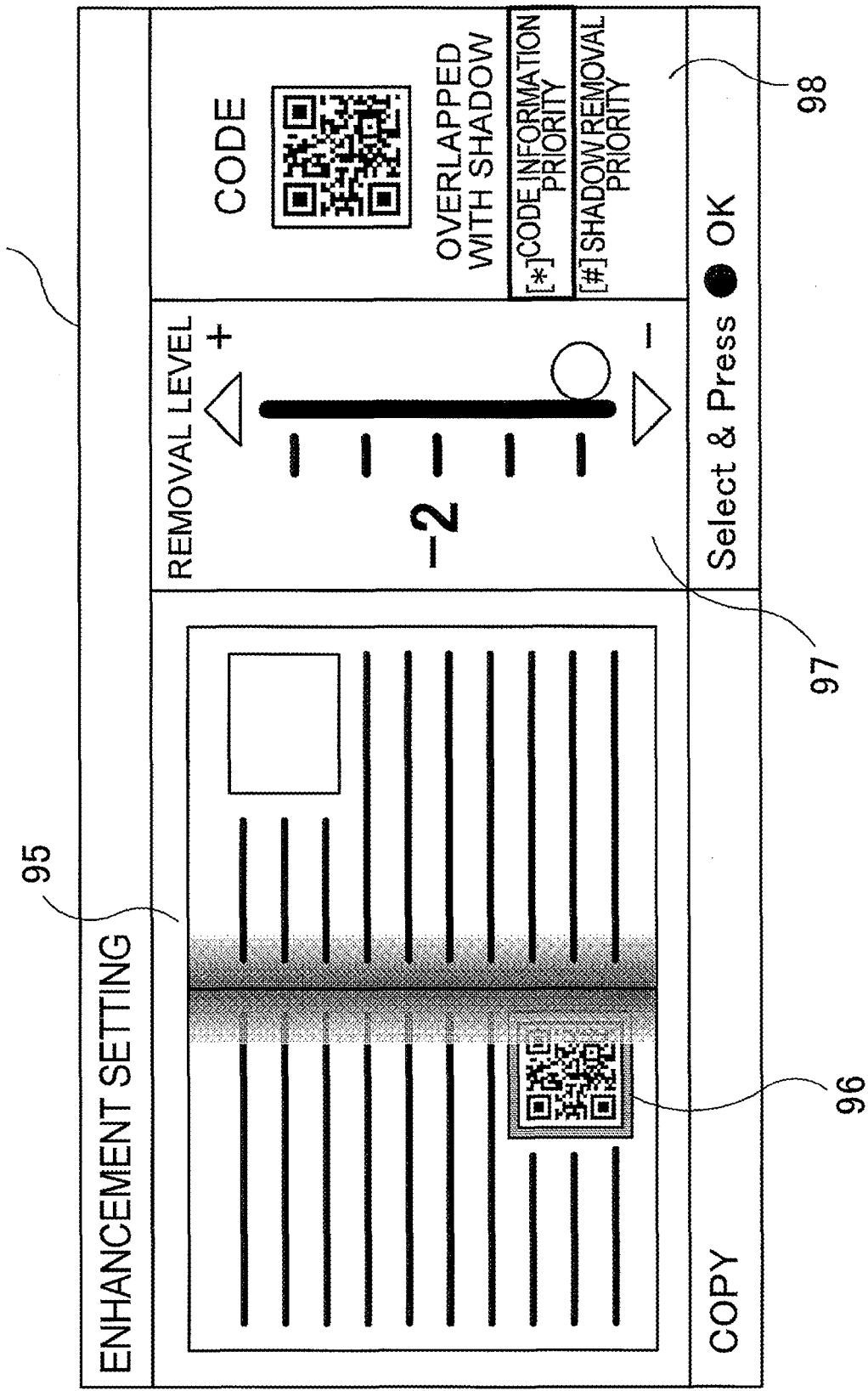
FIG. 15 shows a first display example of an enhancement setting screen displayed on an LCD.

Herein, a detail of the enhancement setting display screen displayed on the LCD 41 will be described with reference to the drawing. FIG. 15 is an example of the enhancement setting screen. As illustrated in FIG. 15, the enhancement setting screen is composed of three display areas including a preview display area 95, a removal detail setting display area 97, and a selection display area 98. The preview display area 95 displays a preview image based on the image data stored in the image memory 23A. The removal detail setting display area 97 displays the currently set removal level. In the display example of FIG. 15, a state in which the removal level "−2" is selected is illustrated. The selection of the removal level can be arbitrarily changed, for example, through an operation of a cursor key or the like on the operation key 40 by the user.

In addition, the selection display area 98 displays options related to the two-dimensional code. To be more specific, two options including an option "code information priority" and an option "shadow removal priority" are displayed in the selection display area 98. The option "code information priority" indicates a mode in which the shadow data removal is executed (S40 and S41 which will be described later) when the removal of the shadow data is performed on the image data displayed in the preview display area 95, while the two-dimensional code 90 remains readable. On the other hand, the option "shadow removal priority" indicates a mode in which the removal of the shadow data is executed (S42 which will be described later) on the image data displayed in the preview display area 95, irrespective of whether the two-dimensional code 90 is damaged. It should be noted that in the selection display area 98 displays a message that the overlapping area 83 where the shadow area 80 is overlapped with the two-dimensional code area 81 exists.

In the two-dimensional code enhancement display processing (S35), first, the CPU 21 refers to the image memory 23A to generate display purpose preview image data on the basis of the stored image data. At this time, on the basis of the two-dimensional code area information, a code enhancement display 96 is added in the surrounding of the two-dimensional code. The code enhancement display 96 highlights the two-dimensional code 90 in the preview image data, and surrounds the two-dimensional code 90 in a predetermined color (for example, red, yellow, or the like). After that, the CPU 21 displays the preview image on the preview display area 95 on the basis of the preview image data to which the code enhancement display 96 is added.

In addition, in the two-dimensional code enhancement display processing (S35), the CPU 21 refers to the user setting storage area 24A to identify the currently set removal level (that is, the density conversion pattern). Then, the CPU 21 displays the currently set removal level in the removal detail setting display area 97. It should be noted that at this time, in a case where the overlapping area 83 exists in the image data, the CPU 21 displays the message that the overlapping area 83 exists in the selection display area 98 as well as the above-mentioned two types of options ("code information priority" and "shadow removal priority"). After the predetermined displays are performed in the preview display area 95, the removal detail setting display area 97, and the selection display area 98, the CPU 21 shifts the processing to S36.

When the processing is shifted to S36, the CPU 21 determines whether or not the removal level change operation is performed. To be more specific, the CPU 21 determines if the removal level change operation is performed on the basis of the operation signal from the operation key 40. In a case where the removal level change operation is performed (S36: YES), the CPU 21 shifts the processing to S37. On the other hand, if the removal level change operation is not performed (S36: NO), the CPU 21 shifts the processing to S38.

When the removal level change operation is performed and the processing is shifted to S37, the CPU 21 executes a removal level change processing. In the removal level change processing (S37), the CPU 21 identifies the removal level after the change (that is, the density conversion pattern) in accordance with the removal level change operation by the user and stores the information related to the removal level in the user setting storage area 24A. With this configuration, the multi function peripheral device 1 is put into a state where it is possible to execute the shadow removal at the shadow removal level desired by the user. After the removal level change processing (S37), the CPU 21 returns the processing to S35.

Figure 16:
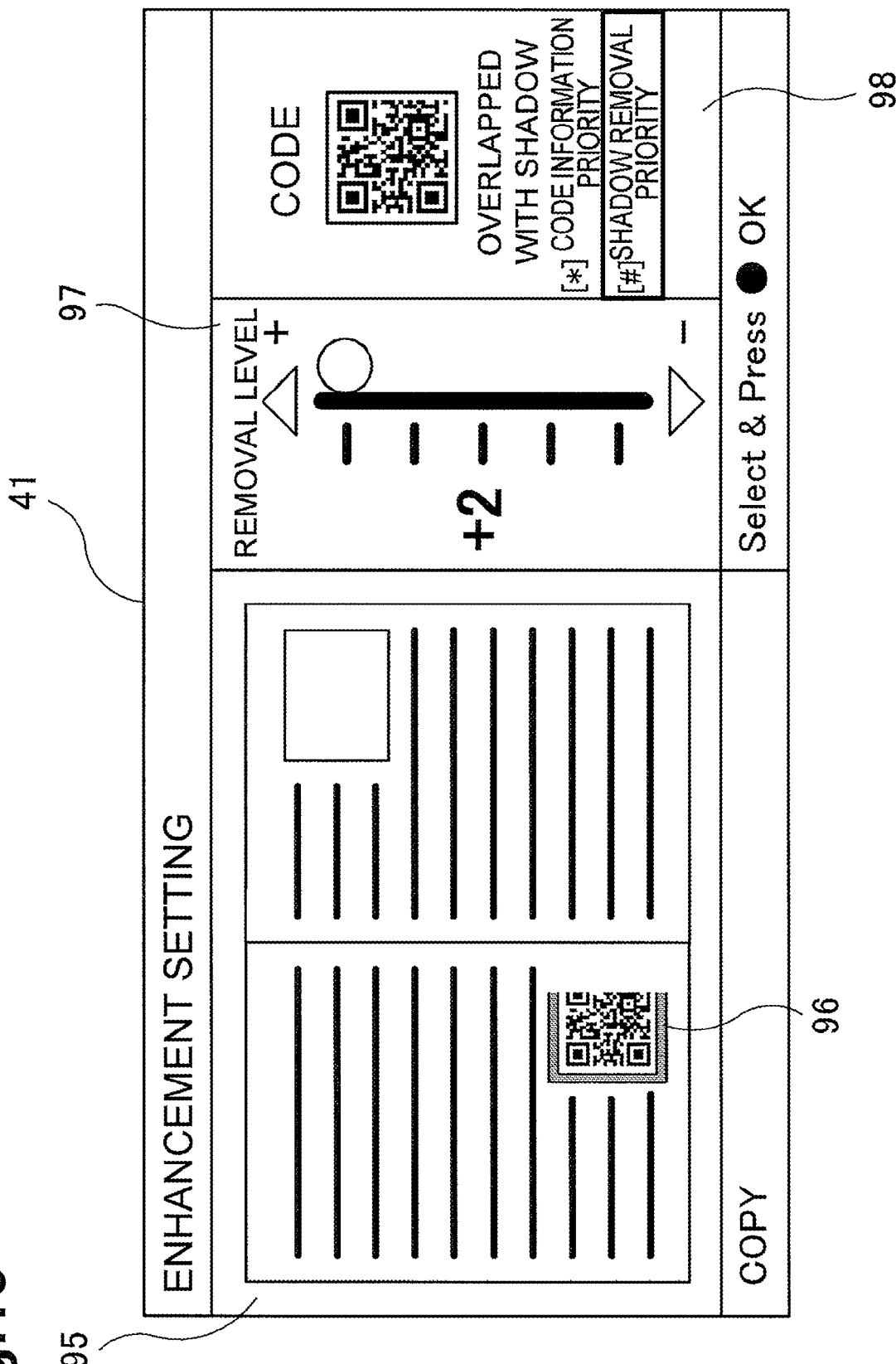
FIG. 16 shows a second display example 2) of the enhancement setting screen displayed on the LCD.

When the removal level is changed through the removal level change processing (S37), in S35, the CPU 21 regenerates the preview image data in which the removal of the shadow data is performed on the basis of the density conversion pattern corresponding to the removal level after the change, and displays the preview image in the preview display area 95 on the basis of this data (refer to FIG. 16). With this configuration, the user can recognize how the change in the removal level affects the shadow removal in the image data and may easily set the desired shadow removal mode. At this time, the CPU 21 changes the display of the removal level in the removal detail setting display area 97 (refer to FIGS. 15 and 16).

When the processing is shifted to S38, the CPU 21 executes a code necessity selection processing. In this code necessity selection processing (S38), the CPU 21 accepts any one of the selections including the option "code information priority" and the option "shadow removal priority" on the basis of the operation signal from the operation key 40. The selection result based on the selection operation by the user is stored in the RAM 23, and thereafter the CPU 21 shifts the processing to S39.

Subsequently, in S39, the CPU 21 determines whether the option "code information priority" is selected. To be more specific, the CPU 21 refers to the RAM 23 to perform the determination in S39 on the basis of the selection result stored in the code necessity selection processing (S38). In a case where the option "code information priority" is selected (S39: YES), the CPU 21 shifts the processing to S40. On the other hand, in a case where the option "shadow removal priority" is selected (S39: NO), the CPU 21 shifts the processing to S42.

When the processing is shifted to S40, the CPU 21 executes the nonspecific area shadow removal processing. The nonspecific area shadow removal processing (S40) is a processing of removing the shadow related to the nonspecific area by using the density conversion pattern based on the user setting, and is similar to the nonspecific area shadow removal processing (S18) according to the third illustrative embodiment. Therefore, a detailed description about the processing content of the nonspecific area shadow removal processing (S40) will be omitted. After the image data in which the shadow removal is performed with respect to the image data nonspecific area is stored in the image memory 23A, the CPU 21 shifts the processing to S41.

By executing the nonspecific area shadow removal processing (S40), the CPU 21 can perform the removal of the shadow data based on the setting desired by the user with respect to the nonspecific area of the image data. That is to say, the nonspecific area of the image data is put into a fine state in which the shadow data removal desired by the user can be performed.

In S41, the CPU 21 executes the specific area shadow removal processing. The specific area shadow removal processing (S41) is a processing of performing the shadow removal related to the specific area 85 by using the density conversion pattern, and is similar to the specific area shadow removal processing (S19) according to the third illustrative embodiment except for the density conversion pattern to be used. To be more specific, in the specific area shadow removal processing (S41) according to the fourth illustrative embodiment, the CPU 21 uses the density conversion pattern corresponding to "removal level: −2" to perform the shadow removal with respect to the specific area 85 irrespective of the user setting related to the removal level (that is, the density conversion pattern). The CPU 21 stores the image data on which the removal of the shadow data is performed with respect to the specific area 85 in the image memory 23A, and shifts the processing to S42.

When this specific area shadow removal processing (S41) is executed, the CPU 21 uses the density conversion pattern corresponding to "removal level: −2" to perform the shadow removal in the specific area 85. As described above, the density conversion pattern corresponding to "removal level: −2" (that is, the density conversion pattern (5)) is the density conversion pattern prescribed as the lowest density (the density E) indicated by the removal threshold among the density conversion patterns stored in the density conversion table storage area 22A. Therefore, when the shadow removal in the specific area 85 is performed on the basis of the density conversion pattern, the density of the pixel belonging to the specific area 85 is almost unchanged even though shadow removal is slightly performed therein. As a result, even when the specific area shadow removal processing (S41) is executed, the two-dimensional code 90 associated with the specific area 85 is not damaged through the shadow removal. That is to say, by executing the specific area shadow removal processing (S41), the multi function peripheral device 1 may provide the user the output result having the two-dimensional code 90 in a state where the two-dimensional code 90 can be read.

Then, in S42, the CPU 21 executes the normal shadow removal processing. In the normal shadow removal processing (S42), the CPU 21 refers to the user setting storage area 24A to perform the removal of the shadow data in the image data on the basis of the density conversion pattern based on the user setting. The normal shadow removal processing (S42) is similar to the normal shadow removal processing (S6) according to the first illustrative embodiment except that the density conversion pattern based on the user setting is used. Therefore, a detailed description of the processing content of the normal shadow removal processing (S42) will be omitted.

By executing the normal shadow removal processing (S42), the multi function peripheral device 1 according to the fourth illustrative embodiment can perform the removal of the shadow data in the image data of the book original on the basis of the removal level desired by the user (that is, the density conversion pattern).

Then, in S43, the CPU 21 executes the data print processing. In the data print processing (S43), the CPU 21 outputs the recording sheet on which the print based on the image data stored in the image memory 23A is performed. After the image data is printed and output on the recording sheet, the CPU 21 ends the book copy processing program.

As described above, the multi function peripheral device 1 and the book copy processing program according to the fourth illustrative embodiment perform the display indicating the presence of the two-dimensional code 90 in the preview display area 95 and the selection display area 98 of the LCD 41 in a case where the overlapping area 83 where the shadow area 80 is overlapped with the two-dimensional code area 81 exists (S34: YES), as illustrated in FIGS. 15 and 16 (S35). With this configuration, the user can easily recognize the presence of the two-dimensional code 90 in the book original G.

Furthermore, as illustrated in FIGS. 15 and 16, the multi function peripheral device 1 and the book copy processing program display the option "code information priority" and the option "shadow removal priority" in the selection display area 98 (S35), prompt a user to select one of the options and accept a selection of one of these options through the code necessity selection processing (S38). Then, in accordance with the user selection in the code necessity selection processing (S39), the multi function peripheral device 1 and the book copy processing program change the mode of removing the shadow data in the image data (S40 to S42). Therefore, as the user visually recognizes the enhancement setting screen displayed on the LCD 41, the user may determine whether the two-dimensional code 90 is desired or needed in the output related to the image data. Then, the user may select the mode of removing the shadow data in the image data in accordance with the determination regarding the necessity or desirability of the two-dimensional code 90 and obtain the output result based on the selected shadow removal mode.

That is, the multi function peripheral device 1 and the book copy processing program may provide the user with the ability to select an output mode in which quality improvement in the image based on the book original G through removal of the shadow is prioritized (S42 and S43) or an output mode in which the information based on the two-dimensional code 90 can be obtained (S40, S41, and S43).

In addition, in a case where the overlapping area 83 exists (S34: YES), the multi function peripheral device 1 and the book copy processing program execute the two-dimensional code enhancement display processing (S35). That is, as the result of the shadow removal, in a case where the possibility that the two-dimensional code 90 is damaged is high, the user may recognize the presence of the two-dimensional code with certainty and perform the selection as to the necessity or desirability of the two-dimensional code. Furthermore, according to the multi function peripheral device 1 and the book copy processing program, the user can obtain the output result with certainty which is output in the desired mode based on the necessity or desirability of the two-dimensional code 90.

Then, in a case where the overlapping area 83 exists (S34: YES), the two-dimensional code enhancement display processing (S35) is executed, and thus the multi function peripheral device 1 can reduce the number of times needed to execute the two-dimensional code enhancement display processing (S35).

Then, in the two-dimensional code enhancement display processing (S35), the CPU 21 displays the preview image based on the image data stored in the image memory 23A in the preview display area 95. At this time, the CPU 21 adds the code enhancement display 96 in the surrounding of the two-dimensional code 90 included in the image data to display the image data in the preview display area 95. Therefore, the multi function peripheral device 1 and the book copy processing program may provide the user with the appropriate material to determine the necessity or desirability of the two-dimensional code 90. With this configuration, the user can easily recognize the two-dimensional code 90 in the book original G with certainty and readily determine the necessity or desirability of the two-dimensional code 90.

Furthermore, in the preview image displayed in the preview display area 95, as the code enhancement display 96 is displayed in the area surrounding the two-dimensional code 90, the user can easily find the two-dimensional code 90 in the preview image and may recognize the position, the size, and the like of the two-dimensional code 90. As a result, the user may appropriately determine the necessity or desirability of the two-dimensional code 90.

It should be noted that in the specific area shadow removal processing (S41) according to the fourth illustrative embodiment, the density conversion pattern corresponding to "removal level: −2" is used to perform the removal of the shadow data with respect to the specific area 85 of the image data, but the present invention is not limited to this mode. For example, by using another density conversion pattern, shadow removal in the specific area 85 may be executed. In this case, the other density conversion pattern is not limited to the exemplified patterns including "the density conversion pattern (1)" to "the density conversion pattern (5)", but such a configuration may be adopted that another density conversion pattern which is different from the above-mentioned five types of density conversion patterns can be used. In addition, in the specific area shadow removal processing (S41), such a configuration may also be adopted that the shadow removal itself with respect to the specific area 85 is restricted.

Also, according to the fourth illustrative embodiment, in a case where the overlapping area 83 exists (S34: YES), the processing is shifted to S35, and the processing of displaying the enhancement setting screen on the LCD 41 including the two-dimensional code enhancement display processing is performed, but even in a case where the overlapping area 83 does not exist, if the two-dimensional code exists, such a configuration may be adopted that the enhancement setting screen illustrated in FIG. 15 is displayed on the LCD 41 (it should be noted that in this case, the display "overlapped with shadow" is not performed). With this configuration, it is possible to notify the user that the code exists in the original to be copied, and the user may change the shadow removal level as desired on the basis of this notification. In addition, for example, such a measure can be adopted that other settings related to the copy can be changed to settings which take the presence of the two-dimensional code into account. The enhancement display of the two-dimensional code may be configured to be performed irrespective of the presence or absence of the overlapping area 83.

In the above, the present invention has been described on the basis of the first to fourth illustrative embodiments, but the present invention is not limited to the above-mentioned illustrative embodiments at all, and it is easily conceivable that various modifications can be made without departing from the gist of the present invention.

For example, the number of the density conversion patterns in the density conversion table illustrated in FIG. 9 is not limited as the number can be increased or decreased.

Figure 17:
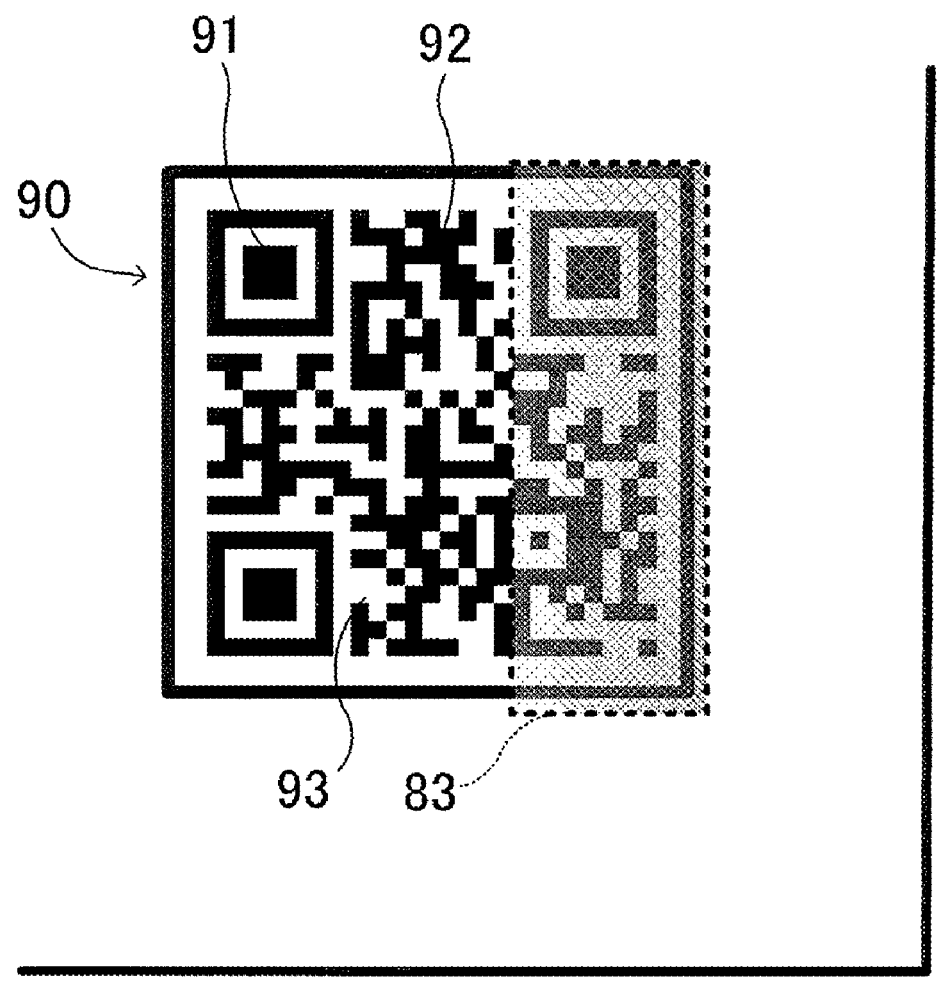
FIG. 17 shows an example of removal of shadow in the vicinity of the two-dimensional code.

In addition, according to the above-mentioned illustrative embodiments, the shadow removal is configured to be performed with respect to the nonspecific area where the specific area 85 including the overlapping area 83 is excluded, but the present invention is not limited to this mode. That is, as illustrated in FIG. 17, by excluding the overlapping area 83 from the shadow removal target, the shadow removal may also be configured to be performed with respect to the area except for the overlapping area in the specific area 85. In this case, as the overlapping area 83 is excluded from the shadow removal target, the information from the two-dimensional code 90 can be obtained in the output result.

Furthermore, as the shadow removal is executed with respect to the area except for the overlapping area 83 in the specific area 85 (refer to FIG. 17), the output result in which the more appropriate shadow removal is performed may be provided to the user.

Furthermore, the present invention may be applied to not only the multi function peripheral device 1 according to the above-mentioned illustrative embodiments but also various apparatuses (for example, a copy dedicated apparatus). That is, the image processing apparatus and the control program for the image processing apparatus according to the present invention do not limit the output mode in the image processing apparatus to the print output with respect to the recording sheet. For example, such a configuration may be adopted that the data is output to another recording medium other than the recording sheet via a recoding part or output to a display part. Furthermore, of course, such a configuration may also be adopted that the data is output to an information processing apparatus such as a personal computer.

What is claimed is:

1. An image processing apparatus, comprising:
   a reading unit configured to read image data of a double-page original having a binding part;
   an output unit configured to generate output based on the image data;
   a processing unit configured to:
      identify shadow data corresponding to a shadow area in the image data;
      determine whether two-dimensional code data is included in the image data;
      determine whether an overlapping area exists where the shadow area overlaps with a two-dimensional code area corresponding to the two-dimensional code data in response to determining that the two-dimensional code data is included in the image data; and
      control removal of the shadow data in the image data in response to determining that the overlapping area exists.

2. The image processing apparatus according to claim 1, wherein the processing unit is further configured to:
   restrict the removal of the shadow data in the overlapping area in response to determining that an overlapping area exists.

3. The image processing apparatus according to claim 2, wherein the processing unit is further configured to prevent the removal of the shadow data in the overlapping area in response to determining that an overlapping area exists.

4. The image processing apparatus according to claim 1, wherein the processing unit is further configured to:
   remove the shadow data in the shadow area in response to determining that an overlapping area does not exist; and
   restrict the removal of the shadow data in response to determining that the overlapping area exists.

5. An image processing apparatus, comprising:
   a reading unit configured to read image data of a double-page original having a binding part;
   an output unit configured to generate an output based on the image data;
   a conversion pattern storage area configured to store a plurality of density conversion patterns; and
   a processing unit configured to:
      receive an input and, in response to the input, convert a density of shadow data corresponding to a shadow area in the image data into a first density conversion pattern from among the density conversion patterns stored in the conversion pattern storage area;
      determine whether two-dimensional code data is included in the image data;
      determine whether an overlapping area exists where the shadow area corresponding to the shadow data in the image data overlaps with a two-dimensional code area corresponding to the two-dimensional code data in response to determining that the two-dimensional code data is included in the image data;
      remove the shadow data from the image data on the basis of the first density conversion pattern in response to determining that the overlapping area does not exist; and
      in response to determining that the overlapping area exists,
         change the first density conversion pattern to a second density conversion pattern from among the plurality of density conversion patterns; and
         remove the shadow data from the image data on the basis of the second density conversion pattern.

6. The image processing apparatus according to claim 5, wherein in response to determining that the overlapping area exists, the processing unit is further configured to
   obtain shadow density data indicating the density part of a portion of the shadow area in the image data in the vicinity of the overlapping area and obtain code density data indicating the density of the two-dimensional code area included in the image data; and
   select one density conversion pattern, as the second density conversion pattern, on the basis of the shadow density data and the code density data.

7. The image processing apparatus according to claim 5, further comprising:
   an operation unit configured to allow a user to select the first density conversion pattern; and
   wherein in response to determining that the overlapping area exists, the processing unit is further configured to
      identify a target area corresponding to the overlapping area in the shadow data; and
      remove the shadow data within the target area corresponding to the overlapping area on the basis of the second density conversion pattern.

8. The image processing apparatus according to claim 7, wherein in response to determining that the overlapping area exists, the processing unit is further configured to remove the shadow data outside the target area on the basis of the first density conversion pattern.

9. The image processing apparatus according to claim 7, wherein in response to determining that the overlapping area exists, the processing unit is further configured to remove the shadow data outside the target area on the basis of the second density conversion pattern.

10. An image processing apparatus, comprising:
    a reading unit configured to read image data of a double-page original having a binding part;
    a display unit configured to display the image data;
    an output unit configured to generate output based on the image data;
    a processing unit configured to:
       identify shadow data corresponding to at least a portion of a shadow area in the image data;
       determine whether two-dimensional code data is included in the image data;
       cause the display unit to display a notification indicating the two-dimensional code data is included in the image data and prompt a user to input whether the two-dimensional code is needed in response to determining that the two-dimensional code data is included in the image data;
       receive a user input selecting whether the two-dimensional code is needed; and
       remove the shadow data on the basis of the user input.

11. The image processing apparatus according to claim 10, wherein in response to determining that the two dimensional code data is included in the image data, the processing unit is further configured to:
    determine whether an overlapping area where the shadow area corresponding to the shadow data in the image data overlaps with a two-dimensional code area corresponding to the two-dimensional code data; and cause the display unit to display the notification and prompt the user to input whether the two-dimensional code is needed in response to determining that the overlapping area exists.

12. The image processing apparatus according to claim 10, wherein the processing unit is further configured to cause the display unit to display the original when the display unit displays the notification.

13. The image processing apparatus according to claim 10, wherein the processing unit is further configured to display the two-dimensional code data included in the image data when the display unit displays the notification.

14. The image processing apparatus according to claim 13, wherein the processing unit is further configured to highlight the two-dimensional code data when displaying the two-dimensional code data with the notification.

15. At least one computer readable media having computer executable instructions stored thereon which, when executed by a processor, perform the method comprising the steps of:
identifying shadow data corresponding to a shadow area in image data of a double-page original having a binding part read by a reading unit;
determining whether two-dimensional code data is included in the image data;
determining whether an overlapping area exists where the shadow area overlaps with a two-dimensional code area corresponding to the two-dimensional code data in response to determining that the two-dimensional code data is included in the image data
controlling removal of the shadow data in the image data in response to determining that the overlapping area exists; and
causing an output based on the image data.

16. The at least one computer readable media according to claim 15, wherein the method further comprises the steps of:
restricting the removal of the shadow data in the overlapping area in response to determining that an overlapping area exists.

17. The at least one computer readable media according to claim 16, wherein the method further includes the step of preventing the removal of the shadow data in the overlapping area in response to determining that an overlapping area exists.

18. The at least one computer readable media according to claim 15, wherein the method further includes the steps of:
removing the shadow data in the shadow area in response to determining that an overlapping area does not exist; and
restricting the removal of the shadow data in response to determining that the overlapping area exists.

19. At least one computer readable media having computer executable instructions stored thereon which, when executed by a processor, perform the method comprising the steps of:
receiving an input and, in response to the input, converting a density of shadow data corresponding to a shadow area in image data of a double-page original having a binding part read by a reading unit into a first density conversion pattern from among a plurality of density conversion patterns;
determining whether two-dimensional code data is included in the image data;
determining whether an overlapping area exists where the shadow area corresponding to the shadow data in the image data overlaps with a two-dimensional code area corresponding to the two-dimensional code data in response to determining that the two-dimensional code data is included in the image data;
removing the shadow data from the image data on the basis of the first density conversion pattern in response to determining that the overlapping area does not exist;
in response to determining that the overlapping area exists, changing the first density conversion pattern to a second density conversion pattern from among the plurality of density conversion patterns; and
removing the shadow data from the image data on the basis of the second density conversion pattern; and
causing an output based on the image data.

20. The at least one computer readable media according to claim 19, wherein in response to determining that the overlapping area exists, the method further includes the steps of
obtaining shadow density data indicating the density part of a portion of the shadow area in the image data in the vicinity of the overlapping area;
obtaining code density data indicating the density of the two-dimensional code area included in the image data; and
selecting one density conversion pattern, as the second density conversion pattern, on the basis of the shadow density data and the code density data.

21. The at least one computer readable media according to claim 19, wherein in response to determining that the overlapping area exists, the method further includes the steps of:
identifying a target area corresponding to the overlapping area in the shadow data; and
removing the shadow data within the target area corresponding to the overlapping area on the basis of the second density conversion pattern.

22. The at least one computer readable media according to claim 21, wherein in response to determining that the overlapping area exists, the method further includes the step of removing the shadow data outside the target area on the basis of the first density conversion pattern.

23. The at least one computer readable media according to claim 21, wherein in response to determining that the overlapping area exists, the method including removing the shadow data outside the target area on the basis of the second density conversion pattern.

24. At least one computer readable media having computer executable instructions stored thereon which, when executed by a processor, perform the method comprising the steps of:
identifying shadow data corresponding to at least a portion of a shadow area in image data of a double-page original having a binding part read by a reading unit;
determining whether two-dimensional code data is included in the image data;
causing a notification to be displayed indicating that a two-dimensional code data is included in the image data;
prompting a user to input whether the two-dimensional code is needed in response to determining that the two-dimensional code data is included in the image data;
receiving a user input selecting whether the two-dimensional code is needed;
removing the shadow data from the image data on the basis of the user input; and
causing an output based on the image data.

25. The at least one computer readable media according to claim 24, wherein in response to determining that the two dimensional code data is included in the image data, the method further includes the steps of:
determining whether an overlapping area where the shadow area corresponding to the shadow data in the image data overlaps with a two-dimensional code area corresponding to the two-dimensional code data; and causing the notification to be displayed and prompting the user to input whether the two-dimensional code is needed in response to determining that the overlapping area exists.

26. The at least one computer readable media according to claim 24, wherein the method further includes the step of causing the original to be displayed when the notification is displayed.

27. The at least one computer readable media according to claim 24, wherein the method further includes displaying the two-dimensional code data included in the image data when the notification is displayed.

28. The at least one computer readable media according to claim 27, wherein the method further includes the step of highlighting the two-dimensional code data when displaying the two-dimensional code data with the notification.

\* \* \* \* \*